(12) United States Patent
O'Toole, Jr.

(10) Patent No.: US 7,024,548 B1
(45) Date of Patent: Apr. 4, 2006

(54) METHODS AND APPARATUS FOR AUDITING AND TRACKING CHANGES TO AN EXISTING CONFIGURATION OF A COMPUTERIZED DEVICE

(75) Inventor: James W. O'Toole, Jr., Somerville, MA (US)

(73) Assignee: Cisco Technology, Inc., San Jose, CA (US)

( * ) Notice: Subject to any disclaimer, the term of this patent is extended or adjusted under 35 U.S.C. 154(b) by 500 days.

(21) Appl. No.: 10/385,028

(22) Filed: Mar. 10, 2003

(51) Int. Cl.
*G06F 9/44* (2006.01)

(52) U.S. Cl. .............. 713/1; 713/2; 713/100; 726/23; 726/24; 709/220; 709/221; 709/222; 717/121; 717/126

(58) Field of Classification Search .............. 713/1, 713/2, 100; 726/23, 24; 709/220, 221, 222; 717/121, 126
See application file for complete search history.

(56) References Cited

U.S. PATENT DOCUMENTS

| | | | |
|---|---|---|---|
| 4,761,646 A * | 8/1988 | Choquet et al. | 340/825.52 |
| 5,535,409 A * | 7/1996 | Larvoire et al. | 726/28 |
| 6,480,955 B1 * | 11/2002 | DeKoning et al. | 713/100 |
| 6,591,373 B1 * | 7/2003 | Ardis et al. | 714/7 |
| 6,728,723 B1 * | 4/2004 | Kathail et al. | 707/102 |
| 6,775,559 B1 * | 8/2004 | Weghorst et al. | 455/558 |
| 6,895,414 B1 * | 5/2005 | Ford et al. | 707/203 |
| 6,898,202 B1 * | 5/2005 | Gallagher et al. | 370/401 |
| 6,901,580 B1 * | 5/2005 | Iwanojko et al. | 717/121 |
| 2002/0188778 A1 * | 12/2002 | Iwanojko et al. | 710/104 |
| 2002/0191548 A1 * | 12/2002 | Ylonen et al. | 370/254 |
| 2002/0198968 A1 * | 12/2002 | Shirriff | 709/220 |
| 2003/0055529 A1 * | 3/2003 | Aosawa | 700/220 |
| 2003/0101247 A1 * | 5/2003 | Kumbalimutt et al. | 709/221 |
| 2004/0019670 A1 * | 1/2004 | Viswanath | 709/223 |
| 2004/0032625 A1 * | 2/2004 | Yamano | 358/405 |
| 2005/0080598 A1 * | 4/2005 | Iwanojko et al. | 702/188 |

* cited by examiner

*Primary Examiner*—A. Elamin
(74) *Attorney, Agent, or Firm*—Chapin IP Law, LLC; Barry W. Chapin, Esq.

(57) ABSTRACT

A change controller application, process and system tracks modification to a configuration of a computerized device by receiving a change request indicating a requested change to an existing configuration of the computerized device and preparing a change notification message identifying the requested change to the existing configuration of the computerized device. The change controller transmits the change notification message to at least one change notification recipient and determines if a change acknowledgement is provided in response. If a change acknowledgement is provided from a change notification recipient that indicates confirmation of receipt of the change notification message, the system allows the requested change to the configuration of the computerized device to take place. If the change acknowledgement is not provided from a change notification recipient, the system conditionally operates the computerized device so that a monitoring device networked to the computerized device perceives that a configuration change to the computerized device may have taken place.

23 Claims, 8 Drawing Sheets

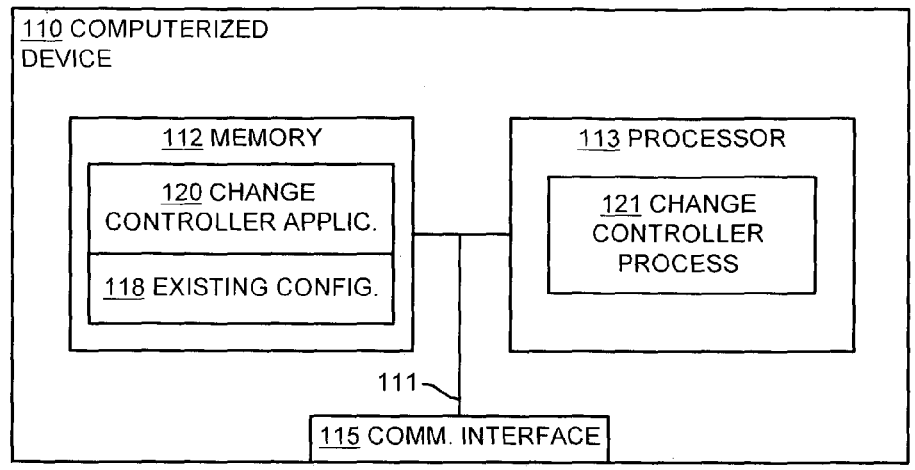

FIG. 3A

FIG. 3B — EXAMPLE CHANGE NOTIFICATION MESSAGE (171, 173, 174)

| 400 USER IDENTITY | 401 COMPUTERIZED DEVICE IDENTITY | 402 CHALLENEGE REQUEST (E.G., RANDOM NUMBER) | 403 TIMESTAMP |
|---|---|---|---|
| 404 SIGNATURE OF EXISTING CONFIGURATION | 405 SIGNATURE OF NEW CONFIGURATION (IF CHANGE WERE TO BE MADE) | | 410 CHG. NOT. RECIPIENT ID. (E.G., 130) |
| 406 DIGITAL SIGNATURE OF COMPUTERIZED DEVICE ||||

FIG. 3C — EXAMPLE CHANGE ACKNOWLEDGEMENT MESSAGE (172, 175, 176)

| 410 CHG. NOT. RECIPIENT ID. (E.G., 130) | 411 COMPUTERIZED DEVICE IDENTITY | 412 CHALLENGE REPONSE (E.G. HASH OF C.N.M. 171,173,174) | 413 TIME-STAMP |
|---|---|---|---|
| 416 DIGITAL SIGNATURE (IF ANY) OF CHANGE NOTIFICATION RECIP. ||||

322
CONDITIONALLY OPERATE THE COMPUTERIZED DEVICE SO THAT A MONITORING DEVICE NETWORKED TO THE COMPUTERIZED DEVICE PERCEIVES THAT A CONFIGURATION CHANGE TO THE COMPUTERIZED DEVICE MAY HAVE TAKEN PLACE

323
PERFORM MANDATORY (AND TEMPORARY) SHUTDOWN SEQUENCE OF THE COMPUTERIZED DEVICE

324
DURING SHUTDOWN TIME PERIOD, MONITORING DEVICE ATTEMPTS TO CONTACT THE COMPUTERIZED DEVICE TO VERIFY OPERATION OF THE DEVICE BUT CANNOT DO SO (DUE TO SHUTDOWN) AND THUS DETECTS MANDATORY SHUTDOWN SEQUENCE OF DEVICE AND INDICATES, INTO CONFIGURATION STATE DATABASE THAT DEVICE WAS SHUTDOWN IN AN UNSCHEDULED MANNER (THUS POTENTIAL FOR MALICIOUS OR UNAUTHORIZED CONFIGURATION CHANGE EXISTS)

FIG. 7

METHODS AND APPARATUS FOR AUDITING AND TRACKING CHANGES TO AN EXISTING CONFIGURATION OF A COMPUTERIZED DEVICE

BACKGROUND OF THE INVENTION

Computerized devices such as computer systems, workstations, data communications devices (e.g., routers, switches, hubs, and the like) or other electronic devices often contain existing configurable state information within the device that controls some aspect of the operation of the computerized device. As an example, a computerized device such as a personal computer includes (e.g., stores) software modules that collectively form an operating system. In addition, conventional computerized devices may maintain a set of associated configuration parameter values that may determine how the operating system modules operate when executed. The software modules and configuration parameter values collectively form a configuration state for that computerized device. The configuration state of a device may further include a current or existing hardware profile of the device identifying current components (e.g., cards, memory, processors and the like) that currently are installed within the device.

An operator, manager or administrator of a computerized device may at some point in time determine a need to modify the existing configuration of the device, for example to upgrade software or change configuration parameter values or hardware within the device in order to cause that device to operate differently or to fix problems in the current device operation and configuration. In many instances, computerized devices that contain changeable configuration state information (e.g., replaceable software modules or modifiable configuration parameters) are equipped to communicate over a computer network such as the Internet or a local area network and may allow remote modifications to be made to the existing configuration information in those devices through a remote management software application programming interfaces (APIs) under control, for example, of a remote management software application.

Conventional mechanisms and techniques that support remote management and modification of existing configuration information within computerized devices usually include various security and access control mechanisms in an attempt to ensure that only authorized users (i.e., device administrators and systems managers) are allowed to modify the existing configuration information within the device. As an example, conventional device management techniques include such features as requiring a valid username and password combination in order to allow access to configuration management capabilities within the device. Once a user that desires to change a configuration of a conventional device supplies the proper username and password for full access to configuration management of the device (e.g., the user supplies the root or administrator password), then he or she can change any configuration parameter, software or hardware that they desire.

Some conventional configuration management systems provide for more robust security features including authentication mechanisms that can operate to validate the identity of a computer system requesting the change to the configuration of the device or that may provide separate usernames and passwords in order to change different configuration areas of the device. Designers of conventional protocols, management software and protection mechanisms that operate as noted above to allow changes to device configuration have equipped such mechanisms to control what happens to the configurations of devices before (e.g., access control), during (e.g., authentication) and after (e.g., logging mechanisms) changes are made.

SUMMARY OF THE INVENTION

Conventional mechanisms and techniques for providing configuration change auditing, tracking and control of computerized device configuration changes suffer from a variety of deficiencies. In particular, conventional configuration change control and tracking systems fail to protect against threats that are currently occurring within computer networks such as the Internet such as denial of service attacks during which the configuration of a device is changed in a manner that is not readily apparent after the denial of service attack is complete. As an example, a typical common technique for circumventing security mechanisms within networked computerized devices includes providing a denial-of-service attack in conjunction or simultaneously with a penetration attack in order to prevent configuration-protected devices from communicating with their management devices during the penetration attack during which the device configuration is subtly changed. As a specific example, one type of denial-of-service attack might be for a malicious individual to intentionally crash or bring-down a particular data communications device to a non-communicating state within the computer network. During the device down-time, a malicious individual gains access to sensitive configuration information within the device in order to install or replace, for example, a software module with a malicious software module that contains destructive code or code that is capable of intercepting privileged communications. After the device is compromised in this manner, the malicious individual allows the device to regain communications on the computer network and the replacement of the former configuration information (i.e., the manufacturers software module) with the malicious configuration information (i.e., a compromised or modified version of the manufacturers software) may be unknown to the manager or administrator of the device.

In other words, conventional mechanisms and techniques for managing security and access control issues with respect to modifying the configuration of the computerized device are susceptible to security lapses that temporarily paralyze the infrastructure of the computerized device while performing username/password penetration that allows malicious individual to obtain super-user (e.g., root user privilege) within the device to install software or otherwise modify the existing configuration of the device in a malicious manner. Once the change is complete, the device is again allowed to operate in the network and network managers and administrators may have no way of detecting the device underwent a configuration change.

The result of these deficiencies in conventional configuration change management systems is that even in very well-managed network environments, a vulnerability exists when devices are unexpectedly or unknowingly removed from communication with supervisory (e.g., management) devices and then compromised during their isolation. Since a malicious individual can reload a computerized device such as a router or switch with a modified version of software for that device that may behave in an atypical manner and that can hide or disguise the fact that data or other information passing through the device is intercepted or copied to a remote destination, detection of such intrusions has proved difficult and is not supported in conventional configuration change management systems.

There are conventional systems that operate to securely verify the integrity of the configuration of the device at startup or boot time when the device is first powered on but such techniques require complex and elaborate data collection and authentication mechanisms and are thus difficult to implement and require significant upfront coordination by software vendors and operators in order to have such boot-time verification techniques operate properly. In addition, such techniques essentially amount to requiring a secure hardware authentication module in every device and thus costs of the device significantly increase when equipped with such capabilities. In addition, it is difficult to guarantee in such systems that the original fingerprint or other verifiable information calculated across the current configuration of the device has not already been tainted by being calculated upon configuration of the device that already contains a previously installed malicious data siphoning mechanism.

Further still, conventional mechanisms for reading a current configuration of the device and reporting this current configuration to a remote monitoring station provide some defense against configuration changes. However, such mechanisms are not sufficient against malicious device attacks where the malicious attacker has either already replaced the software on the device, or in situations in which the malicious attacker changes the configuration of the device so that all incoming management and configuration change requests are relayed to another agent operating on another computerized device. This other device can provide an emulation of the management interface that is adequate enough to transmit the original unchanged and legitimate configuration to the remote monitoring station in a fake or contrived response, thus fooling the monitoring station into assuming that the original device has not been compromised.

Embodiments of the invention provide mechanisms and techniques which significantly overcome the aforementioned deficiencies of conventional change management, auditing and tracking systems used to monitor, detect, audit and control configuration changes made within network accessible computerized devices such as computer systems, data communications devices or the like. Generally, embodiments of the invention limit the potential for a malicious individual or attacker to make a change to an existing configuration of a computerized device without notification of the change being provided to or detected by a monitoring device such as a remote computer system. Embodiments of the invention operate in such a way that if a malicious attacker such as a person or a software program (e.g., a virus or worm) attempts to alter an existing configuration of the device using any conventionally known, but unauthorized manner, the monitoring device is capable of detecting at least the possibility that a change has been made to that device due to the device conditionally operating in response to the attempted change. By conditionally operating, embodiments of the invention can cause the computerized device to, for example, shutdown for a predetermined amount of time that is sufficiently long enough for the monitoring device to detect that the device performed the shutdown sequence.

Embodiments of the invention cause a device that receives a change request to change its existing configuration to attempt to obtain a change acknowledgement from a change notification recipient. The change request may be received from a legitimate manager of the device (e.g., a program or person authorized to change the device) or may be a malicious attempt to corrupt the device that is being attempted by a malicious individual or other attacker, such as an automated agent, virus, worm, or other maliciously implemented software that is attempting to change the device in some manner so as to compromise the operational integrity or security of the device. The change acknowledgement is generally an authenticated authorization for the device to allow the change to the existing configuration of the device to take place. Different attempts may be made to different change notification recipients to obtain a valid change acknowledgement. Change notification recipients can include automated monitoring devices configured according to embodiments of the invention (to be explained) as well as the user submitting the change request.

In the case of a user operating as the change notification recipient, the user must use an alternate communications channel such as a phone call in order to provide change notification information (i.e., information produced from the device in response to the change request that is presented to the user, such as in a message displayed on the user's computer display) to a monitoring station. The monitoring station then produces a valid change acknowledgement (assuming the user provided valid change notification information) communicated to the user over the alternate communications channel (e.g,. back to the user via automated voice prompts over the same telephone call that the user placed to provide the change acknowledgement information). The user can then provide valid change acknowledgement information (e.g., a sequence of alphanumeric information such as a change validation code) back to the change controller (e.g., via a return message provided in a graphical user interface) operating in the computerized device. If no valid change acknowledgement information is received from any change notification recipient, and the user attempting to make the change to the configuration persists (e.g., overrides a decision by embodiments of the invention to not make the change), the device configured to this invention is forced (by embodiments of the invention) to conditionally operate, such as by shutting down for a predetermined period of time prior to allowing the change, in order for a monitoring device to detect that the device may have been subject to a configuration change (e.g., via the monitoring device detecting the device shutdown or absence of the device during a periodic poll to the device to determine its operational state).

In operation of embodiments of the invention, initially, a change controller configured to operate according to embodiments of the invention receives a change request indicating a requested change to an existing configuration of the computerized device. In response, during a first attempt or first sequence to attempt to obtain a change acknowledgement, the change controller prepares a change notification message identifying the requested change to the existing configuration of the computerized device and transmits the change notification message to at least one change notification recipient. In the first sequence, the change notification recipient is a monitoring device such as another computer system that is networked to the computerized device upon which the change is being attempted. The change controller in the computerized device thereafter determines if a change acknowledgement is provided from the change notification recipient (i.e., the monitoring device in the first sequence) in response to transmitting the change notification message. The change acknowledgement, if received, indicates confirmation of receipt of the change notification message (e.g., by the monitoring device in this first sequence). As an example, the change acknowledgement may be a code that can validate proper receipt of the change notification message by the change notification recipient (i.e., the monitoring device). If a change acknowledgement is provided from the change notification recipient (i.e., the monitoring device in a first sequence) that indicates confirmation of receipt of the change notification message (and hence authorizes the change), and thus the change controller allows the change to the configuration of the device to take place.

If, in the first sequence, no change acknowledgement is received from the change monitoring device (e.g., perhaps because a malicious individual or software process or program or another hardware device has attempted to block the change notification message from reaching the change monitor), then the change controller performs steps of preparing and transmitting a second change notification message (e.g., a second change notification message) and determining if a change acknowledgement is provided for a second change notification recipient in a second sequence. The second change notification recipient may be the user (or the user's computer) that submitted the change request (as either a legitimate change requester or possibly operating as a malicious attacking individual or program). In either case, the second change notification message may request the change acknowledgement from the second change notification recipient. The user may view the contents of the second change notification message on a display of the user computer and the message contents may instruct the user that he or she must contact an appropriate change authorization entity such as the monitoring system via another alternate communications mechanism, such as via a telephone call or an email message, in order to input or otherwise provide (e.g., via telephone keypad in response to automated voice prompts, or in a forwarded email) the change notification information obtained from viewing the change notification message. In other words, if attempts by the change controller to retrieve an automated change acknowledgement fail (i.e. possibly due to block communications with the first change notification recipient that is the monitoring device) then the user (i.e., who is now in the position of the second change notification recipient) is presented with change notification information (e.g, a code requiring a specific validate answer) and this user must contact the appropriate change authorization entity (i.e., another change notification recipient, which may also be the monitoring device contacted using an interface such as an automated voice response system), in order to enter the change notification information (e.g., the change information containing a code that must be validated). After valid entry of the proper change notification information to the second change notification recipient via the alternate communications channel, the user will receive a proper change acknowledgement (e.g, a return code via automated voice prompt, or in an automated reply email or other message) that that user can then enter into his or her user computer (e.g., via a web based or other graphical user interface) in response to the change notification message.

If properly entered, then the change controller will receive this change acknowledgement and thus allow the requested change to take place to the existing configuration of the device. Alternatively, if the second change notification recipient (i.e., the user or an attacker program or device, who or which may be attempting to maliciously change the configuration of the device), cannot obtain and/or provide a valid change acknowledgement back to the change controller, then the device that received the change request can conditionally operate (e.g., shutting down for a predetermined amount of time) so that the monitoring device networked to the computerized device is capable of detecting that a configuration to the device may have taken place.

In this manner, the change controller of this invention can first attempt to obtain a valid change acknowledgement from one or more automated monitoring devices via network communications. If none is received (e.g., after a time out period for each), then the change controller can present the user (a second change notification recipient) with a change notification message as well, to which that user must obtain, (i.e., via an alternative communications path to the monitoring device) and supply in response, a valid change acknowledgement. If none is supplied, one embodiment allows the user to be able to continue with the change to the existing configuration of the device, but in such cases of allowing a change without receipt of a valid change acknowledgement, the change controller causes the device to conditionally operate, such as by shutting down for a predetermined time period. This time period (i.e., shutdown time) is enough for the monitoring device to determine that the computerized device is out of communication in an abnormal manner and thus the monitoring device is able to perceive that the computerized device has somehow been maliciously compromised and its configuration can no longer be trusted. This perception can be translated into processing operations within the monitoring device, for example, by emailing, instant messaging, or otherwise notifying a network administrator of the occurrence of the detected conditional operation of the device (detected by the monitoring device) thus placing the administrator on notice that the computerized device may be compromised in some manner.

In other embodiments of this invention, to prepare the change notification message, the change controller can generate a challenge request for the change notification message. The challenge request corresponds to an associated challenge response that, if received by the computerized device, can confirm receipt of the challenge request by the monitoring device. The change controller produces change notification signature information based on new configuration information specified within the change request that is to modify the existing configuration of the computerized device. The change notification signature information may including i) a signature of the new configuration information within the change request, ii) an identity of a user that provides the change request to the device, iii) an identity of the computerized device that received the change request, and/or iii) a timestamp associated with the change request. As such, the change notification signature information can uniquely identify the change requested as related to the existing configuration. The change controller combines the challenge request and the change notification signature information within the change notification message in preparation for transmission to the change notification recipient(s). Since this information is then sent to the monitoring device, the monitoring device tracks all authorized changes made to the device.

In all cases, if the change acknowledgement is not provided from the change notification recipient, the change controller operates the device so that a monitoring device networked to the computerized device perceives (i.e., detects) that a configuration change to the device may have taken place. Thus embodiments of the invention significantly limit damage that can occur due to human error and security lapses during the administration of programmable, configurable, and re-loadable software and/or hardware-operated computerized devices or other devices operating in a networked computer environment.

In another embodiment, the requested change to the existing configuration of the device indicated within the change request includes either a change to a configuration setting of the device that controls operation of the device, and/or a replacement of software code in the device or replacement of a hardware component within the device. As such, embodiments of the invention provide significant deterrence from individuals hacking into a device, since the invention will cause a remote monitoring device to detect such activities indirectly via suspicion raised when the device conditionally operates, such as by shutting down, due to not receiving a valid change acknowledgement.

In yet another embodiment, the change controller operates to transmit the change notification message and determine if a change acknowledgement is provided from the change notification recipient in a first sequence for a first change notification recipient such as a monitoring device. If the change acknowledgement is not provided from the first change notification recipient, the operations of transmitting the change notification message and determining if a change acknowledgement is provided are performed again in a second sequence for a second change notification recipient such as a user of a device that provided the change request to the computerized device.

In a further embodiment, in the first sequence, the step of transmitting the change notification message transmits the change notification message containing the challenge request to the monitoring device networked to the computerized device. User interaction is thus not required at this point. In addition, in this embodiment, the step of determining if a change acknowledgement is provided from the at least one change notification recipient comprises the steps of determining if a change acknowledgement containing a valid challenge response, based on the challenge request, is received in a predetermined amount of time. The valid challenge response, if received, indicates that the monitoring device successfully received the change notification message identifying the requested change to the existing configuration of the computerized device. If the change acknowledgement containing a valid challenge response is received in a predetermined amount of time, the change controller performs the steps of allowing the change to the configuration of the device to take place and acknowledging receipt of the change acknowledgement containing the valid challenge response. Alternatively, if a change acknowledgement containing a valid challenge response is not received in a predetermined amount of time, the change controller performs the steps of transmitting the change notification message and determining if a change acknowledgement is provided in a second sequence for a second change notification recipient. The second change notification recipient is a user of the device that provided the change request to the computerized device.

In still another embodiment, in the second sequence, the step of transmitting the change notification message to the second change notification recipient comprises the steps of transmitting the change notification message for visual display of at least a portion of the change notification message to the user of the device that provided the change request to the computerized device. In this manner, the user attempting the change is presented, for example, with a challenge and must obtain and then provide, in response, a proper change acknowledgement containing a proper challenge response. Also in this embodiment, the step of determining if a change acknowledgement is provided from the second change notification recipient (i.e., the user attempting the change) comprises the steps of determining if a change acknowledgement containing a valid challenge response, based on the challenge request, is received from the user of the device. The valid challenge response, if received, indicates that user of the device successfully communicated the requested change to the existing configuration of the computerized device to the monitoring device. If a change acknowledgement containing a valid challenge response is received from the user of the device, the change controller performs the step of allowing the change to the configuration of the device to take place. Alternatively, if a change acknowledgement containing a valid challenge response is not received from the user of the device that provided the change request, the change controller performs the step of conditionally operating the device so that a monitoring device networked to the computerized device perceives that a configuration change to the device may have taken place.

In one embodiment, the step of conditionally operating the device so that a monitoring device networked to the computerized device perceives that a configuration change to the device may have taken place comprises the steps of performing a mandatory shutdown sequence of the device during which the monitoring device attempts to contact the device to verify operation of the device but cannot do so thus allowing the monitoring device to detect the mandatory shutdown sequence of the device. In this manner, but forcing or otherwise mandating the shutdown of a device before allowing the unauthorized change to proceed, embodiment of the invention ensure that the monitoring device will at least perceive that a change may have been made, due to the shutdown.

In yet another embodiment, the step of conditionally operating the device so that a monitoring device networked to the computerized device perceives that a configuration change to the device may have taken place comprises the steps of querying the user of the device that provided the change request to the device to determine if the user desires to approve the requested change to the existing configuration of the computerized device even though a valid challenge response was not received by the device. If the user of the device desires to approve the request change to the existing configuration of the device, the change controller performs a mandatory shutdown sequence of the device during which the monitoring device attempts to contact the device to verify operation of the device but cannot do so thus allowing the monitoring device to detect the mandatory shutdown sequence of the device and hence perceive (i.e., indicate to a network administrator) the possibility that a malicious change to the device may have taken place since not change acknowledgement was ever received before the conditional operation (e.g., before the mandatory shutdown).

Other embodiments provide a computerized device comprising a communications interface, a memory, a processor and an interconnection mechanism coupling the communications interface, the memory and the processor. In the computerized device, the memory is encoded with change controller application that when performed on the processor, produces a change controller process that causes the computerized device to track modification to a configuration of the computerized device by performing the processing steps outlined above and explained in detail herein.

The computerized device may be any type of computer or electronic device (e.g., personal computer, workstation, server, web proxy, load balancer, etc.), hardware device, peripheral device, data communications device (e.g., switch, router, hub, bridge, network access server, etc.) or other device configured with software and/or circuitry to process and perform all of the method operations noted above and disclosed herein as embodiments of the invention that are related to the computerized device. In other words an electronic device such any computer or data communications device that is programmed with a change controller application and/or process configured to operate as explained herein is considered an embodiment of the invention.

Other arrangements of embodiments of the invention that are disclosed herein include software programs to perform the method embodiment steps and operations summarized above within any type of computerized device. More particularly, a computer program product is disclosed which has a computer-readable medium including computer program logic encoded thereon that, when executed on at least one processor with a computerized device, causes the processor to perform the operations (e.g., the methods and processing steps) indicated herein that are considered embodiments of the invention for the computerized device. Software programs that perform the functions of the change controller process are considered embodiments of the invention. Such embodiments of the invention are typically embodied as software, logic instructions, code and/or other data (e.g., data structures) arranged or encoded on a computer readable medium such as an optical medium (e.g., CD-ROM), floppy or hard disk (e.g., magnetic medium) or within another computer readable medium such as firmware or microcode in one or more ROM or RAM or PROM chips or as an Application Specific Integrated Circuit (ASIC). These software, firmware or other such configurations can be installed onto a computer system or other device (e.g, switch, router, etc.) to provide a change controller that causes such devices to perform the techniques explained herein as embodiments of the invention.

The embodiments of the invention may be implemented by computer software and/or hardware mechanisms within any computing apparatus. It is to be understood that the embodiments of the invention can be embodied strictly as a software program, as software and hardware, or as hardware and/or circuitry alone. The features of the invention, as explained herein, may be employed in computerized devices and/or software systems for such devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

FIG. 3A illustrates architecture of a computerized device equipped with a change controller application that a processor performs as a change controller process in accordance with embodiments of the invention.

FIG. 3B illustrates example contents of a change notification message in accordance with one embodiment of the invention.

FIG. 3C illustrates example contents of a change acknowledgement message in accordance with one embodiment of the invention.

FIGS. 4 through 7 are a flow chart of processing steps that illustrate details of an example operation of embodiments of the invention.

DETAILED DESCRIPTION OF EMBODIMENTS

Figure 1:
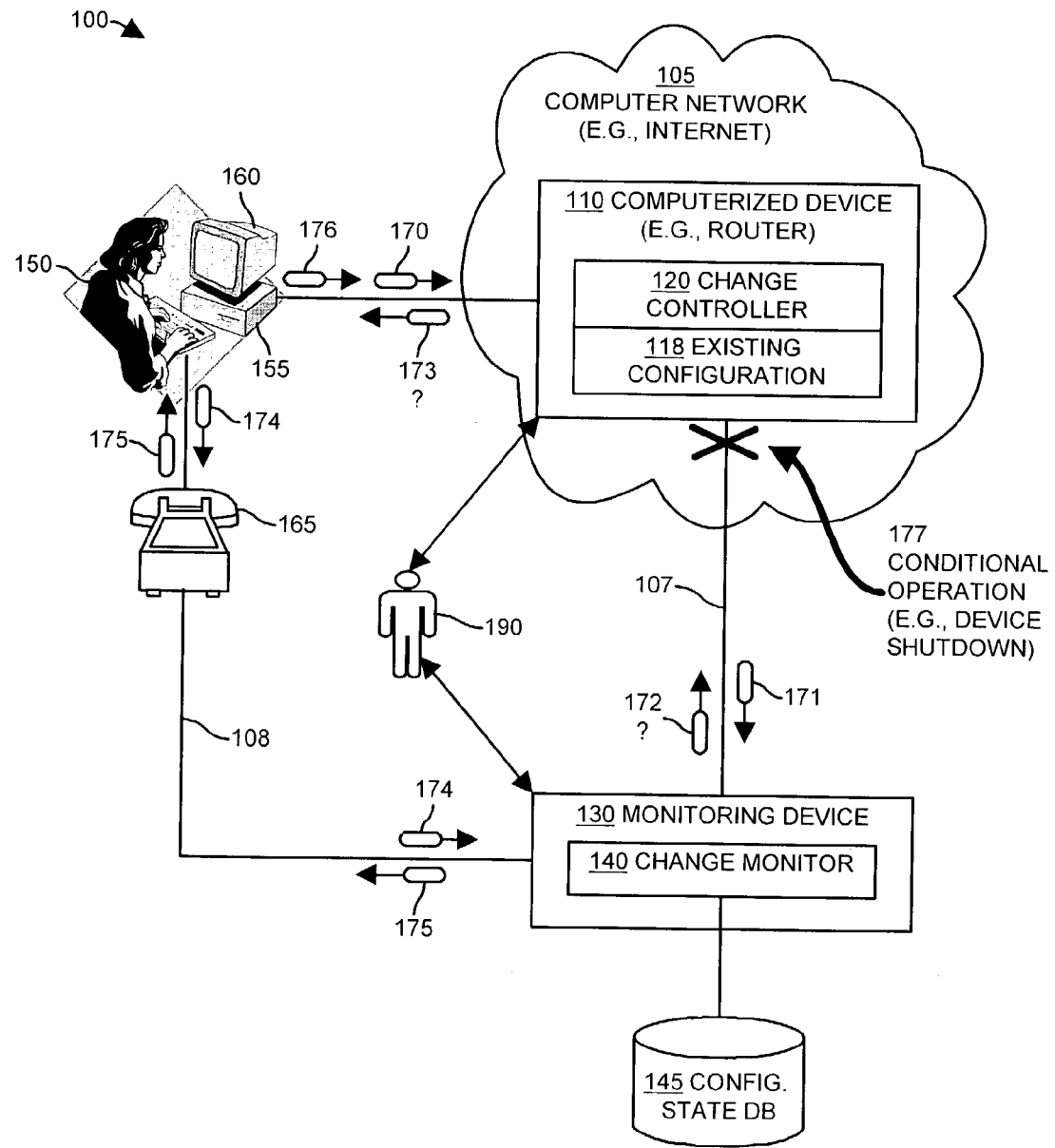
FIG. 1 illustrates a computing system environment including a computerized device configured to operate in accordance with embodiments of the invention.

Embodiments of the invention provide mechanisms and techniques which significantly overcome the aforementioned deficiencies of conventional change management systems used to monitor, detect and control configuration changes made within network accessible computerized devices such as computer systems, data communications devices or the like. Generally, embodiments of the invention limit the potential for a malicious individual or software program (e.g., virus, worm, etc.) to make a change to an existing configuration of a computerized device without notification of the change being provided to or being detectable by a monitoring device such as a remote computer system. Embodiments of the invention operate in such a way that if a malicious attacker (e.g., person or program) attempts to alter an existing configuration of the device using any conventionally known, but unauthorized manner, a monitoring device configured according to embodiments of the invention is capable of detecting at least the possibility that a change has been made to that computerized device due to the computerized device (also configured according to embodiments of the invention) conditionally operating in response to the attempted change.

By conditionally operating, what is meant, for example, is that embodiments of the invention operating as a change controller can cause the computerized device to shutdown or otherwise conditionally operate for a predetermined amount of time that is sufficient enough for the monitoring device to detect that the device performed the shutdown sequence. In response to receipt of a change request, embodiments of the invention cause a computerized device that is to validly undergo a change to its existing configuration to attempt to obtain a change acknowledgement from a change notification recipient. The change acknowledgement is generally an authenticated authorization for the computerized device to allow the change to the existing configuration of the device to take place. A change controller of this invention operating in the computerized device can make different attempts to different change notification recipients (e.g., a monitoring device or a person or program attempting to make the change) in order to obtain a valid change acknowledgement. If no change acknowledgement is received from any change notification recipient, and the user or program attempting to make the change to the configuration of the computerized device persists, the change controller causes the computerized device to conditionally operate such as by shutting down for a predetermined period of time in order for a monitoring device to detect that the computerized device may have potentially been subject to a configuration change.

A monitoring device equipped with a change monitor in accordance with embodiments of the invention includes the ability to detect the conditional operation of the computerized device that may indicate that an unauthorized configuration change may have taken place to the computerized device. This can be done, for example, by detecting an unscheduled shutdown of the computerized device 110 using a periodic polling technique to ensure the computerized device is operating properly during non-scheduled maintenance times.

FIG. 1 illustrates a computing system environment 100 configured in accordance with embodiments of the invention. The computing system environment 100 includes a computer network 105 such as a corporate or Local Area Network (LAN) or any other type of network (e.g., Internet) within which the computerized device 110 configured with a change controller 120 operates in accordance with embodiments of the invention. As also illustrated, the computing system environment 100 includes a monitoring device 130 that operates a change monitor 130 (e.g., program or process) configured to access a configuration state database 145. A network administrator 190 (i.e., a person) is responsible for general authorized administration of the computerized device 110 and in this example, can also access the monitoring device 130 as needed. In this example, another user 150 is capable of operating, as will be explained, a user computer 155 that includes a display 160. The user computer 150 is capable of communicating over the network 105 with the computerized device 110. In addition, in this example the user 150 may or may not be authorized to make changes to the existing configuration 118 of the computerized device. The user 150 is able to operate a communications device 165 such as a telephone in order to contact, in this example, the monitoring device 130 also as will be explained. Various information and/or data messages 170 through 176 are exchanged in this example to illustrate operation of the change controller 120 within the computerized device 110 configured in accordance with embodiments of the invention.

The computerized device 110 can be any type of electronic or computer operated device. In this example, the computerized device 110 is a router, switch or other data communications device that is capable of transferring or routing data within the computer network 105. Operation of the computerized device 110 is governed or controlled by the existing configuration 118. The existing configuration 118 thus represents any configurable or replaceable hardware or software items within the computerized device 110 such as software images (e.g., operating system, control programs, routing software and the like), hardware modules (e.g., circuit boards, blades, firmware images, microprocessor or memory chips, or any other replaceable circuit or hardware components), configuration state settings (e.g., jumper settings), software parameter settings and/or any other modifiable or changeable configuration information or data or componentry.

The change controller 120 is any type of software and/or hardware or a combination thereof within the computerized device 110 that operates according to embodiments of the invention to control auditing of any modifications made to the existing configuration 118 by, for example, any user 150 or 190 or by a software management program or system such as the user computer 155. As will be explained with respect to this example illustrated in FIG. 1, the user 150 may or may not be a malicious user who operates the user computer 155 to supply a change request 170 to the computerized device 110 in order to carry out an attempt to change some aspect of the existing configuration 118. The change request 170 may be, for example, a request to reload or replace a software module or image within the computerized device with a different or newer version.

Prior to allowing the requested change within the change request 170 to take place, the change controller 120 operates according to embodiments of the invention to forward change notification messages 171 and/or 173 (in a sequence to be explained) in an attempt to obtain a valid change acknowledgment message 172 or 176 (both to be explained) from a change notification recipient such as the monitoring device 130 or the user 150 requesting the change. The contents of the change notification messages 171 and 173 and the change acknowledgements is such that the change notification recipient such as the monitoring device 130 (i.e., the change monitor process 140) can log or otherwise identify the requested change within the configuration state database 145. If the change controller 120 is unable to obtain a valid change acknowledgment 172 or 176, and the user 150 persists in his or her attempt to cause a change the existing configuration 118 of the computerized device 110, the change controller 120 forces or otherwise mandates a conditional operation 177 of the computerized device 110.

In this example embodiment, the conditional operation 177 causes a shutdown or other idle state condition within the computerized device 110 that causes the communications link 107 between computerized device 110 and the monitoring device 130 to be broken for a certain amount of time as illustrated in FIG. 1. As a result of this conditional operation 177 (i.e., a shutdown in this example) the change monitor process 140 operating within the monitoring device 130 detects the conditional operation 177 of the computerized device 110. This may be done, for example, when the change monitor 140 detects a loss of a heartbeat or other communications signal periodically sent (e.g., every 20 seconds) as shown by communications 192, 194 between the computerized device 110 and the monitoring device 130. The conditional operation 177 may occur for a period of time (e.g., greater than 20 seconds) that is sufficient for the monitoring device 130 to perceive the computerized device 110 may have undergone an unauthorized change to its existing configuration 118 (e.g., because there is a loss of communications). In other words, in the example in FIG. 1, the monitoring device may poll 192 the computerized device 110 at certain predetermined time intervals. The computerized device 110 can respond to each poll 192 with a response 194 indicating that the computerized device 110 is operating properly. Alternatively, the device 110 may periodically send a heartbeat 194 every N seconds which the change monitor 140 will detect. During a conditional operation however, the device 110 with not engage in the polling protocol 192, 194 (or send a heartbeat signal, etc.) and thus the monitoring device 130 is capable (assuming it is operating properly) of detecting the conditional operation. Note that there may be more than one monitoring device 130 operating in the system 100 for redundancy and/or load sharing purposes.

The change monitor 140 can save this condition (i.e., the loss of communication with the device 110 due to its conditional operation) within the configuration state database 145. As a result of the conditional operation 177, the network administrator 190 of the computerized device 110 can review the configuration state database 145 or may be automatically notified of the conditional operation (i.e., by the change monitor 140 via email, for example) in order to investigate the conditional operation 177 that occurred with respect to the computerized device 110. The network administrator can examine the existing configuration 118 to see if it has been modified and may no longer trust this computerized device 110 for authenticity of proper operation. In secure environments, if a conditional operation of a computerized device occurs, the condition 177 can serve as a security signal to identify devices 110 that may have been compromised by malicious users 150 (i.e., hackers).

In addition to processing change notification and acknowledgement messages as explained above, in step 367, a monitoring device equipped with a change monitor in accordance with embodiments of the invention includes the ability to detect a conditional operation of the computerized device 110 that may indicate that an unauthorized configuration change may have taken place to the computerized device 110. This can be done, for example, by detecting an unscheduled shutdown of the computerized device 110 using a periodic polling technique 192, 194 (FIG. 1) to ensure the computerized device is operating properly during non-scheduled maintenance times.

Further details of processing operations performed by the change controller 120 according to embodiments of the invention will be explained next with respect to the flow chart of processing steps illustrated in FIG. 2.

Figure 2:
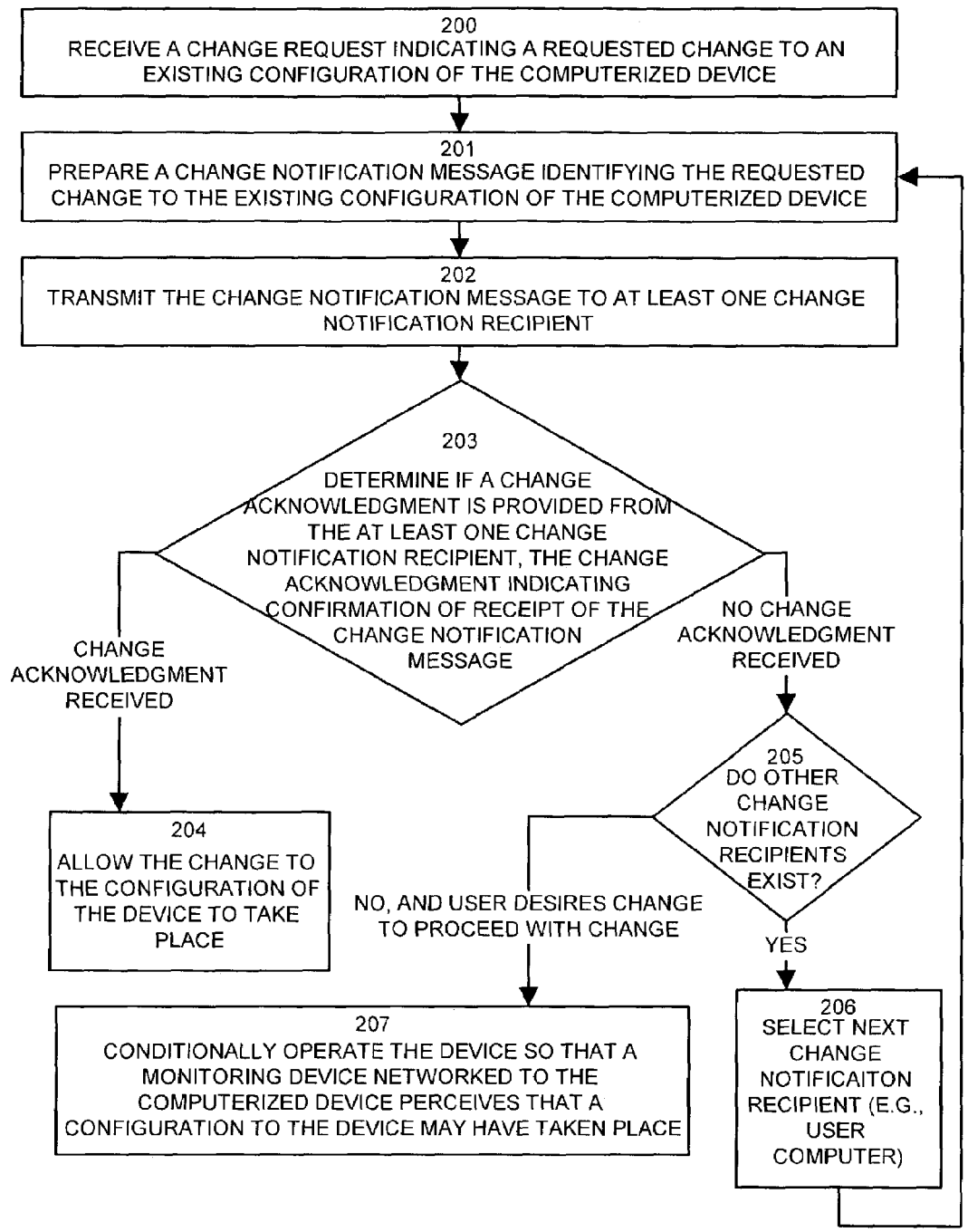
FIG. 2 is a flow chart of processing steps that show operation of a change controller operating within a computerized device in accordance with one example embodiment of the invention.

FIG. 2 is a flow chart of processing steps performed by a change controller 120 configured in accordance with one example embodiment of the invention. The processing steps shown in FIG. 2 will be explained with reference to the example computing system environment 100 illustrated in FIG. 1.

In step 200, the change controller 120 receives a change request 170 indicating a requested change to the existing configuration 118 of the computerized device 110. The requested change within the change request 170 may specify that a specific user 150 (via operation of, for example, computerized device configuration management software operating within the user computer 155) desires to change any type of information, data, parameters or the like within the existing configuration 118. As a specific example, suppose the user 150 is a malicious user and is attempting to replace a portion of the operating system that controls the computerized device 110 in order to monitor or snoop data packets to siphon usernames and passwords for forwarding to a remote computer located elsewhere in the network 105.

In response to receiving the change request 170, the change controller 120 prepares a change notification message 171 that identifies the requested change (e.g., a replacement of the operating system module) to the existing configuration 118 of the computerized device 110. Within the change notification message 171, the change controller 120 can include challenge information as well as a software or hardware checksum of the software or hardware to which the change was directed. The change notification message can include identity of the user 150, a user computer identity 155 (e.g., a hostname and/or network address), a timestamp, and other information. The change controller 120 may have computed the software checksum of the existing configuration 118 upon initial installation of the existing configuration 118. The change controller 120 may also digitally sign the change notification message 171 using a private key associated with or assigned to the change controller 120 or to the computerized device 110. In this manner, the change notification message 171 identifies or indicates the particular change that is being requested to the existing configuration 118 and further contains complete authentication information that uniquely identifies this change notification message 171 as originating from the computerized device 110 (i.e., the message 171 cannot be forged).

Next, in step 202, the change controller 120 transmits the change notification message 171 to at least one change notification recipient 130. In the example illustrated in FIG. 1, the change controller 120 first attempts to transmit the change notification message 171 to the change monitor 140 operating within the monitoring device 130. As such, the monitoring device 130 in this example is the first change notification recipient to which the first change notification message 171 is transmitted.

If the monitoring device 130 successfully receives and processes the change notification message 171, the change monitor process 140 operating within the monitoring device 130 will store the information within the change notification message 171 in the configuration state database 145. In addition, the change monitor process 140 will prepare a proper change acknowledgment 172 and will transmit the change announcement 172 onto the computer network 105 for receipt by the change controller 120 operating within the computerized device 110.

Directing attention to step 203 in FIG. 2, the change controller 120 awaits receipt of the change announcement 172 after transmission of the first change notification message 171. Accordingly, in step 203, the change controller 120 determines if a change acknowledgment is provided from the change notification recipient (to which the most recent change notification message was transmitted). The change announcement 172 indicates confirmation of receipt of the change notification message 171 and if received, processing proceeds to step 204.

In step 204, assuming the change controller 120 received the change acknowledgment message 172, the change controller 120 allows the requested change specified within the change request message 170 to the existing configuration 118 of the device to take place.

Returning attention to step 203, if no change announcement is received from the change notification recipient (i.e., the monitoring device 130 in this first sequence to which the change notification message was transmitted in step 202) processing proceeds to step 205. One reason for which no change acknowledgment 172 is received from the monitoring device 130, in response to the change controller 120 transmitting the change notification message 171, is that the user 150 is a malicious user and has cut off or otherwise compromised or isolated communications between the computerized device 110 and the monitoring device 130 in an attempt to circumvent any security mechanisms in place related to auditing of changes to the existing configuration 118. The user 150 may have, for instance, installed a mechanism within the computer network 105 to intercept and capture the change notification message 171 transmitted to the monitoring device 130 in an attempt to prevent the monitoring device from recognizing or logging the fact that the user 150 is changing the existing configuration 118.

In step 205 the change controller 120 determines if other change notification recipients exist from which there is a potential to obtain a valid change acknowledgment message. As an example, the change controller 120 can maintain a list of multiple monitoring devices 130 that are capable of providing valid change acknowledgment messages 172-1, 172-2 and so forth in response to receiving a change notification message 171-1, 171-2 and so forth. In addition to maintaining a list of multiple monitoring devices 130, in this example, there is no other such monitoring device. However, another change notification recipient may be the user computer 155 under control of the user 150 that submitted the original change request message 170. In other words, a valid change notification recipient may be the user 150 that submits the change request. Accordingly, since in the example illustrated in FIG. 1 the user 150 is a valid change notification recipient (i.e., the user's computer 155 which submitted the original change request 170), at least one other change notification recipient exists (i.e., to which a change notification message is not yet been sent) and thus processing proceeds to step 206.

In step 206, the change controller 120 selects the next change notification recipient (e.g., from a list of valid change notification recipient. In this example, the next change notification recipient is the user 150 operating the user computer 155 since no other monitoring devices 130 exist within the computer network 105. After processing of step 206 is complete, processing returns to step 201 to again prepare a change notification message 173 (in FIG. 1). Note that if the change notification recipient is a user 150 of the user computer 155 that submitted the change request 170, the specific format of the change notification message 173 may be text or other information (e.g., graphics) that can be graphically displayed on the display 160 for viewing by the user 150. This is contrasted with the format of the change notification message 171 sent to the monitoring device 130 which may be formatted for optimal storage within the configuration state database 145. Specific details with respect to example formats of the change notification messages 171 and 173 and the change acknowledgment messages 172 and 176 will be explained shortly with respect to FIGS. 3B and 3C.

After again processing steps 201 and 202, the change controller 120 has performed a second sequence of preparing the change notification message and transmitting this message 173 to a second change notification recipient that in this example is the user computer 155 under control of the user 150. The display 160 of the user computer can display message indicating to the user 150 that they must now contact a valid monitoring device 130 via an alternative communication channel 108 in order to supply change notification information 174 to the monitoring device 130 which then returns valid change acknowledgement information 175 that is then processed (e.g., placed into a message) by the user computer into a change acknowledgement 176 that is returned to the computerized device 110 before allowing the authorized change to take place. Note that the change notification information 174 the a user provides to the monitoring device 174 in FIG. 1 may be same content as contained in the change notification message 173 displayed to that user, for example, on a display 160 of the user's computer 150.

In other words, after the change controller 120 transmits the second change notification message 173 to the user computer 155, the user computer 155 can display the contents of this message on the display 160 and can include, for example, information instructing the user 150 to place a telephone call using the telephone 165 to a monitoring device facility containing the monitoring device 130. Upon placing such a call, the monitoring device 130 can answer the call via communications line 108 (the alternative communications channel to the monitoring device 130) and the monitoring device 130 can provide automated voice response to prompt the user 150 to enter the contents of the change notification message 173, as the change notification information 174, letter by letter or digit by digit into the telephone keypad of the telephone 165.

In this manner, the second change notification message 173 can cause the user 150 to provide the contents of the change notification message as change notification information 174 (i.e., which may be the same data or contents as 173, but without packet headers, etc.) to the monitoring device via the alternate communications channel 108. If the user 150 enters the change notification information 174 from the change notification message 173 in a valid and accurate manner, the change monitor process 140 will generate a proper change acknowledgement response 175 which a voice synthesis processing system in the monitoring device 130 can automatically read back to the user 150. The user 150 can then enter this information 175 into the user computer 155 in the form of the change acknowledgment message 176 (i.e., containing the change acknowledgement response information, data or content 176) that the user computer 155 then transmits back to the computerized device 110 for receipt by the change controller 120.

In this manner, embodiments of the invention allow the change controller 120 to receive the change acknowledgement 176 containing change acknowledgement information 175 that the monitoring device 130 receives from an alternate communications channel 108. Accordingly, returning attention to step 203 for this second sequence, assuming the user 150 properly enters the change acknowledgement information 175 into the user computer 155 and causes the user computer 155 to transmit this information as a valid change acknowledgment 176 back to the change controller 120, then in step 203 the change notification recipient provides a valid change acknowledgement 176 and processing proceeds to step 204 in order to allow the change to the configuration 118 of the device 110 to take place, as previously explained.

Alternatively, in step 203 if the user 150 ignores the change notification message 173 and does not operate the communications mechanism 165 (i.e., the telephone in this example) in order to obtain change acknowledgement information 175 and thus does not provide a valid change acknowledgement 176 back to the change controller 120, processing step 203 proceeds again in this second sequence to step 205.

In this example, since there are no other change notification recipients that exist other than the monitoring device 130 and the user computer 155 under control of the user 150 (to which change notification messages 171 and 173 have already been sent in an attempt to obtain a valid change announcement 172 or 176), then processing proceeds to step 207.

In step 207, the change controller 120 conditionally operates the computerized device 110 so that the monitoring device 130 networked to the computerized device 110 perceives that a configuration change to the existing configuration 118 of the computerized device 110 may have taken place. In the illustrated example, the change controller 120 causes a device shutdown of the computerized device 110 for a period of time that is long enough for the change monitor process 140 operating within the monitoring device 130 to detect that the computerized device 110 is not functioning properly. As a result of detection of the conditional operation 177, the change monitor 140 can indicate, within the configuration state database 145, that an unscheduled shutdown of the computerized device 110 has occurred in thus there is a possibility that the existing configuration 118 of the device has been changed or compromised in some manner. Accordingly, the change monitor 140 can automatically notify (e.g., via email or an instant message) the network administrator 190 that the conditional operation 177 of the computerized device 110 has taken place thus indicating to the network manager 190 that he or she should investigate situation to determine if an unauthorized existing configuration change has taken place.

In this manner, embodiments of the invention operate to attempt to obtain change acknowledgment messages from multiple change notification recipients in response to a requested change 170. Since one of the change notification recipients can be the user 150 requesting the change, and this user 150 must use an alternate communications mechanism to contact a monitoring facility to obtain valid change acknowledgement information 175 in order to prevent conditional operation 177 of the device 110. Accordingly, a malicious user 150 attempting to perform an unauthorized change to the existing configuration 118 will not be permitted to do so without the change controller 120 at least providing the perception to the monitoring device 130 that the possibility of such a change may have taken place. It is noted that embodiments of the invention are not necessarily designed to prevent the change to the existing configuration 118 from being at all possible, but rather provide mechanisms to at least identify situations in which the existing configuration 118 may have become compromised.

FIG. 3A illustrates architecture of an example computerized device 110 configured in accordance with one example embodiment of the invention. The computerized device 110 includes an interconnection mechanism 111 such as a data bus or other circuitry that interconnects a memory system 112, a processor 113 and a communications interface 115. The memory system 112 or memory is encoded with a change controller application 120. The change controller application 120 represents software code, data and/or logic instructions encoded within a computer readable medium (i.e., the memory 112 in this example) that, when executed on the processor 113, enables the computerized device 110 to perform according to embodiments of the invention as explained herein.

The processor 113 may be any type of central processing unit, microprocessor, controller of other circuitry that can access the change controller application 120 over the interconnection mechanism 111 in order to execute, run, interpret, operate or otherwise perform the change controller application 120 thus forming a change controller process 121 that operates according to embodiments of the invention as explained herein. In other words, the change controller application 120 represents a change controller software program that allows the computerized device 110 to operate as explained herein. The manufacturer of the computerized device 110 can provide the change controller 120 as part of the initial configuration of the computerized device 110.

While not specifically illustrated in FIG. 1 or 3A, it is to be understood that the monitoring device 130 can be configured in a manner similar to the computerized device 110 so as to include an interconnection mechanism coupling a memory, a processor and communications interface. Likewise, the change monitor 140 may be comprised of a change monitor application residing in memory such as in firmware and a processor within the monitoring device 130 can operate to access the change monitor application to form the change monitor process. Alternatively, the change monitor 140 may be embodied within hardware or circuitry within the monitoring device 130 and may be equipped with an automated call handling mechanism in order to receive the change notification information 174 over the alternate communications Channel 108 which may be a telephone line, for example.

FIG. 3B illustrates example contents of a change notification message 171 or 173 (and 174, as manually entered by the user 150 in the example in FIG. 1). It is to be understood that the message contents illustrated in FIGS. 3B and 3C is provided by way of example only and is not intended to be limiting to embodiments of the invention. In this example, the change notification message contains a user identity 400 that identifies a username of the user 150 (or a process id if the "user" is a software program operating to request the change) that logged in or otherwise connected to the computerized device 110 and submitted the change request 170. If the user 150 is a malicious user (e.g., a hacker or an attacker software program such as a worm or virus) and somehow has circumvented or obtained control of super user, root or other device administrator privileges within the computerized device 110, the user identity 400 reflects the purported identity (e.g., super user, administrator or root) that the user 150 (or the program or process requesting the change) is using as a privileged account to make changes in the existing configuration 118 of the computerized device 110. The example change notification messages 171, 173 and 174 also contain a computerized device identity 110 such as a network address or host name of the computerized device within the computer network 105. Also included is a challenge request field 402. The challenge request 402 may be, for example, a random number or hash value that the change controller 120 generates during creation of the change notification message 171 to uniquely identify the change request 170. The timestamp field 403 contains the date and time of receipt of the requested change 170. In addition, signature fields 404 and 405 contain respective digital signatures of the existing configuration 118 (signature 404) and of the new configuration (signature fields 405) if the requesting change within the change request 174 were allowed to take place.

In other words, during preparation of the change notification message 171 and/or 173, the change controller 120 can, in this example, obtain a digital signature of the existing configuration 404 (e.g., as a stored parameter previously calculated) and can also calculate a new digital signature of the existing configuration 118 as if this configuration were to be modified by the requested change within the change request 170. This example also includes a change notification recipient identification field 410 that specifies the device (e.g, change monitoring device 130) to which the change notification message is sent. Finally, the change notification messages 171 and 173 each include a digital signature 406 of the change controller 120 for the computerized device 110. Since the change controller 120 digitally signs the change notification messages 171 and 173, forgery of these messages is particularly difficult if not impossible.

FIG. 3C illustrates an example of the contents of a change acknowledgement message 172, 174 or 176. In this example, the change acknowledgement includes the change notification recipient identity 410 such as an IP address, hostname or username of the user computer 155 and/or the user 150 or the address of the monitoring device 130. In addition, the change acknowledgement 172, 174 or 176 includes the computerized device identity 411 to which this change acknowledgement is being provided (i.e., from the monitoring device 130 or from the user computer 155). Note that field 411 is optional and not required for embodiments of the invention. Also included is a challenge response 412, a timestamp 413 and a digital signature 416.

The challenge response 412 may be, for example, a hash value that the monitoring device 130 calculates according to a pre-agreed upon hashing algorithm (i.e., agreed upon by the monitoring device 130 and the computerized device 110 during, for example, configuration of such devices) based on the contents of one or more fields 400 through 405 (or all fields) of the change notification message 171, 173 or 174 to which this change acknowledgement message 172, 175, 176 corresponds. In other words, when the monitoring device 130 receives change notification information within the change notification message 171, 173, and 174 (via the alternative communications channel 108 from the user telephone 165), the change monitor 140 can compute a secure hash 412 of the fields 400 through 105 (and possible 406) and can provide this information as the challenge response field 412 within the change acknowledgement message 172, 175 or 176.

As another example, in one embodiment of the invention, to do the notification and the acknowledgement sequence of messages between the change controller 120 and the change monitor 140, the change notification message 171 or 173, 174 (FIG. 3B) can also contain the destination or recipient identification field 410 from FIG. 3C (as shown in this example of FIG. 3B). In addition, the digital signature field 406 can be a digital signature of all the fields 400, 401, 410, 402, 403, 404, and 405, computed according to an agreed-upon signature algorithm. Then for the change acknowledgement message 172 or 175, 176 (FIG. 3C), these messages could include all those same fields 400, 401, 410, 402, 403, 404, and 405 (from FIG. 3B) but the change monitor 140 replaces item 406 with item 416, so that the same fields are now being signed by the recipient change monitor 140 of the original change notification message information from FIG. 3B.

Generally, the change controller 120 that receives the change acknowledgement message 172, 175 or 176 is a thus able to use the challenge response field 412 (i.e., calculated according to the pre-agreed hashing algorithm) to authenticate and/or otherwise verify that the change acknowledgment 172, 173 or 176 that it receives in response to the specific change notification message 171 or 173/174 is a valid change acknowledgement message. The digital signature field 416 is included within the change announcement message 172, 175 and 176 to validate the identify of the monitoring device 130 by the computerized device 110. In this manner, the change controller 120 can verify the authenticity of a particular change announcement 172 and 176.

As noted above, it is to be understood that the particular fields in the change notification and acknowledgement messages can vary depending upon the desired implementation. As an example variation discussed above, the content of the change notification message 171, 173 and 174 could include the identity 410 of the recipient change monitoring device as well as the fields illustrated in FIG. 3B. Other variations are also possible and are contemplated as being within the scope of embodiments of the present invention.

Using the aforementioned architecture, embodiments of the invention provide for robust and secure auditing of changes that take place to existing and successive or iterative configurations 118 of the computerized device 110. While embodiments of the invention may not prevent a malicious attack on a computerized device from occurring in all circumstances, such embodiments significantly reduce the ability for a malicious user or software program 150 to compromise an existing configuration 118 of a device while remaining undetected. Since embodiments of the invention mandate or otherwise force a conditional operation of the device, such as a shutdown, in the event that a valid change acknowledgement message 172, 176 are not received in response to a change request 170, at a minimum, the monitoring device 130 at least is able to perceive or otherwise detect that a change may have taken place to a device 110.

Note that embodiments of the invention include the change controller functionality operating within a computerized device 110 as explained herein, without regard to the functionality in the monitoring device 130. In other words, in the event of a computerized device performing a condition operation such as a shutdown procedure, it is not required that a monitoring device 130 actually detect the shutdown sequence, but rather that the computerized device 110 be capable of operating such that is a monitoring device 130 is properly functioning, that the monitoring device 130 be capable of detecting or perceiving that the shutdown sequence occurred. Likewise, the independent functionality of the monitoring device 130 explained herein is also considered an embodiments of the invention. To this end, embodiments of the invention include the operation of the computerized device 110 containing the change controller 120 as explained herein, as well as the operation of the monitoring device 130 containing the change monitor 140 as explained herein, either each operating independently from one another, or operating as a system (as in the examples explained herein).

FIGS. 4 through 7 are a flow chart of processing steps showing details of embodiments of the invention in order to provide secure auditing and tracking of configuration changes and modifications to configurations of a computerized device. Details of processing steps shown in the flow chart in FIGS. 4 through 7 will be discussed in relation to the examples provided above and illustrated in FIGS. 1, 3A, 3B and 3C.

In step 300 a requesting entity such as a user 150 controlling a user computer 155 submits a change request 170 to the computerized device 110 in order to modify the existing configuration 118 of the computerized device 110 (e.g., in order to upgrade software, change configuration parameters war and more removals hardware or other components to the device 110).

Next, in step 301, the change controller 120 operating within the computerized device 110 receives the change request 170 indicating a requested change to the existing configuration 118 of the computerized device 110. Sub-steps 302 and 303 define some examples of change requests indicating specific requested changes to the existing configuration 118 of the computerized device 110.

In sub-step 302, the change controller 120 receives a change request 170 in which the requested change to the existing configuration 118 of the device 110 includes a change to configuration settings of the device 110 that controls operation of the device 110. As an example, the change request 170 may specify that the user 150 desires to modify an operational parameter of the computerized device 110 such as a bandwidth setting on a particular port of a router.

As an alternative or in addition to sub-step 302, sub-step 303 indicates that the requested change to the existing configuration of the device indicated within the change request 170 includes a replacement of software code in the device. As an example, the user 150 may supply the change request 170 that specifies to replace a particular operating system module of the router 110 with an upgraded or alternative version. It is to be understood that the examples shown in sub-steps 302 and 303 are provided by way of example only and that other requested changes may be submitted within the change request 170 as well, such as for example, changes to the hardware configuration of the device 110.

Next, in step 304, the change controller 120 prepares a change notification message 171 identifying the requested change to the existing configuration 118 of the computerized device 110. Sub-steps 305 through 307 illustrated example processing operations that the change controller 120 performs to prepare a change notification message 171.

In step 305, the change controller 120 generates a challenge request for the change notification message 171. The challenge request corresponds to an associated challenge response value that, if received by the computerized device 110, can confirm receipt of the challenge request. In other words, in step 305, the change controller 120 generates a challenge request that is unique for this particular change notification message and that has a proper associated challenge response answer. The challenge request may be, for example, a random number or other value which the monitoring device 130 can receive and process in order to provide a challenge response in a change acknowledgment 172 (or 176) that the change controller 120 can use to verify that the change notification message 171 was properly received and stored within the configuration state database 145 (i.e., by the change monitor 140).

Next, in step 306, the change controller 120 produces change notification signature information based upon new configuration information (e.g., the specific change requested) as specified within the change request 170 that is to modify the existing configuration 118 of the computerized device. In this example embodiment, the change notification signature information can include a signature of the new configuration information specified within the change request 170 as applied to the existing configuration 110, such as a checksum value or other signature value of the new software module that the user requests to have installed into the existing configuration 118. In addition, the change notification signature information can include an identity of a user 150 that provides the change request 170 to the device 110 and can also include an identity of the computerized device 110 (e.g., an IP address or device name within the network 105) that received the change request 170. Further still, the change notification signature information can include a timestamp associated with the change request 170. Generally, in step 306, the various fields for the change notification message 171 are prepared as explained above with respect to the examples change notification message illustrated in FIG. 3B.

In step 307, the change controller 120 combines the challenge request 402 (FIG. 3B) and the change notification signature information (i.e., the remaining fields 400 through 406 in FIG. 3B) within (i.e., to create) the change notification message 171 in preparation for transmission to one or more change notification recipients 130 and/or 155. After completion of step 307, preparation of the change notification message 171 (and 173 for subsequent change notification recipients) is complete and processing proceeds to the top of the flow chart illustrated in FIG. 5.

Figure 4:
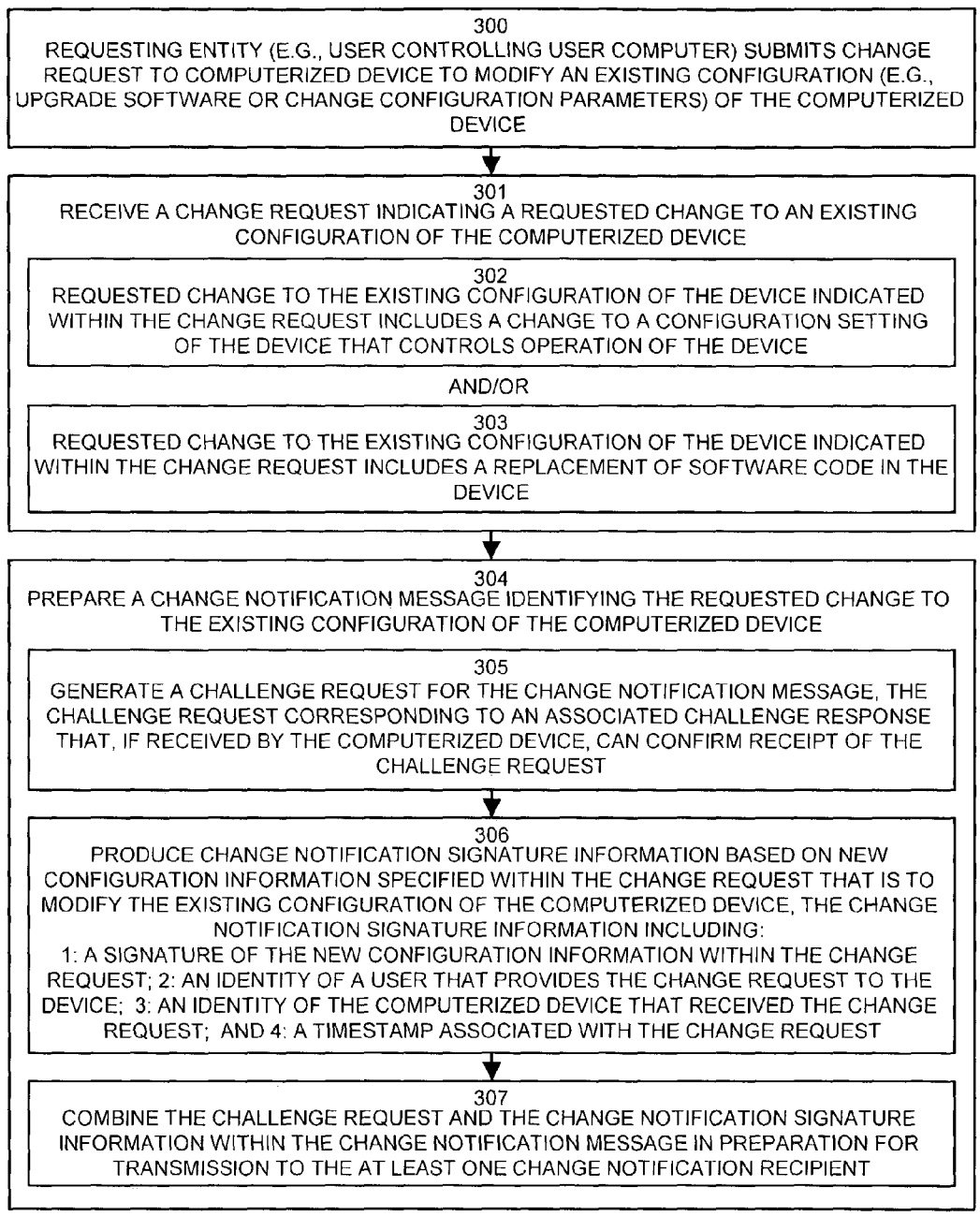
Figure 5:
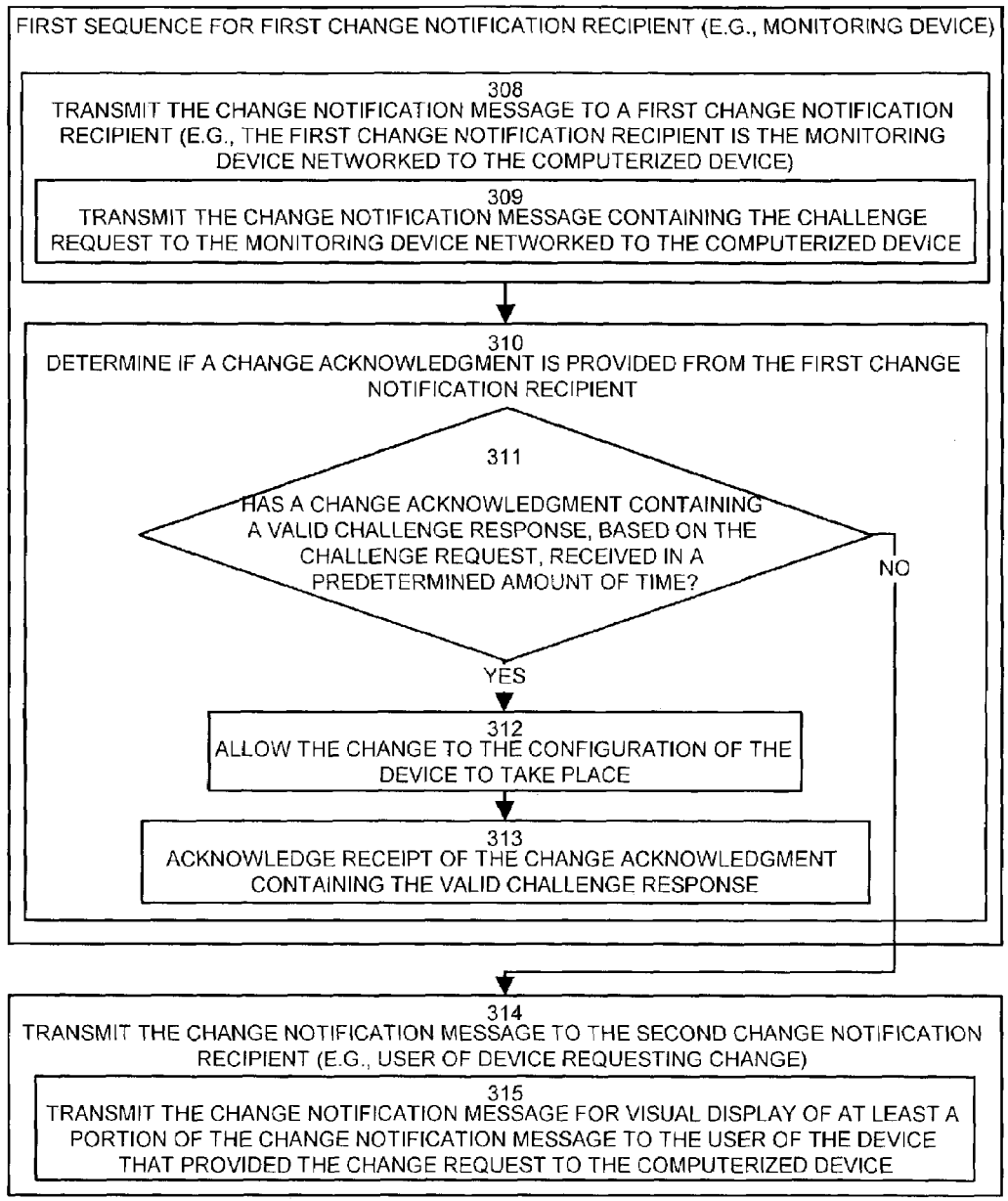

FIG. 5 is a flow chart of processing steps that continues processing from step 307 in FIG. 4. Steps 308 through 313 defined a first sequence of processing which the change controller 120 performs for a first change notification recipient such as the monitoring device 130 illustrated in the example in FIG. 1.

In step 308, the change controller 120 transmits the change notification message 171 to a first change notification recipient.

As shown in sub-step 309, in this first sequence the change controller 120 transmits the change notification message 171 containing the challenge request to the monitoring device 130 networked to the computerized device 110 as illustrated in the example in FIG. 1.

Next, in step 310 the change controller 120 determines if a change acknowledgment 172 is provided from the first change notification recipient 130 (i.e., the change monitor process 140).

To make such a determination, in step 311 the change controller 120 determines if a change acknowledgment 172 containing a valid challenge response 412, based on the challenge request 402, has been received from the first change notification recipient 130 in a predetermined amount of time. A valid challenge response 412 may be, for example, a verified secure hash value that the change monitor process 140 operating within the monitoring device 130 computes based on the random number challenge request 402 provided from the change controller 120 in the change notification message 171. The change controller 120 in step 311 can perform a predefined hash algorithm on a challenge response 412 to ensure or verify that it corresponds to the challenge request 402. In this manner, the change controller 120 can be assured that the monitoring device 130 successfully received and processed the change notification message 171. If the change controller 120 receives the change acknowledgment 172 containing the valid challenge response within the predetermined amount of time, then processing proceeds to step 312.

In step 312 the change controller 120 allows the requested change (specified in the change request 170) to the configuration of the computerized device 110 to take place. In other words, if a valid change acknowledgment 172 is received, the change controller 120 allows the change to take place without interruption.

After step 312, the change controller 120 processes step 313 to acknowledge receipt of the change acknowledgment 172 containing the valid challenge response 412. The monitoring device 130 can receive the acknowledgment can thus the transaction is complete and processing is finished for this thread of this embodiment of the invention.

Returning attention to step 311, if no change acknowledgment containing a valid challenge response is received from the first change notification recipient (i.e., from the monitoring device 130 in this example) processing proceeds to step 314 to enter a second sequence for subsequent change notification recipients. As noted above, subsequent change notification recipients can include other monitoring devices or, alternatively, after all monitoring devices have been contacted in attempts to receive valid change acknowledgment 172, the change controller 120 can select the user computer 155 under control the user 150 as a change notification recipient in an attempt to have a user 150 provide a valid change acknowledgment 176 which that user 150 can obtain from an alternative communications channel to a monitoring facility operating the monitoring device 130.

In step 314 then, the change controller 120 enters a second sequence for a second change notification recipient and transmits the change notification message 173 to the second change notification recipient.

In sub-step 315 the change controller 120 transmits the change notification message 173 for visual display of at least a portion of the change notification message 173 to the user 150 of the device (i.e., user computer 155) that provided the change request 170 to the computerized device 110. In other words, in step 315 the change controller forwards a version of the change notification message 171 (prepared in step 304 and sub-steps 305 through 307) as a new change notification message 173 that may be displayed on the display 160 of the user computer 155 for viewing by the user 150. The change notification message 173 can include text instructions that the user 150 can read in order to proceed to use his or her alternate communications mechanism 165 such as a telephone in order to call into or otherwise connect with a monitoring facility that operates the monitoring device 130. When the user 150 dials into the monitoring device 130, the monitoring device 130 can operate call processing software to prompt the user 150 to input change notification message information 174 via the keypad of a telephone for receipt by the monitoring device 130 (i.e., for receipt by the change monitor 140).

Assuming the user 150 properly enters the correct change notification information 174 in response to voice prompts by the monitoring device 130, the change monitor 140 will generate a valid change acknowledgment and provide change acknowledgment information 175 back to the user 150 over the telephone line 108. The user 150 can then type into an input device (e.g., keyboard) of the user computer 155 the change acknowledgment information 175 in order to prepare a valid change acknowledgment message 176 which the user computer 155 can transmit back to the computerized device 110 for receipt by the change controller 120. The interface within the user computer 155 for display of the change notification message information 173 and for receipt of change acknowledgment information 175 maybe, for example, a web-based interface that uses pop-up windows to prompt the user 150 to enter the appropriate information once a telephone connection has been established between the user's telephone 165 and the monitoring device 130.

Figure 6:
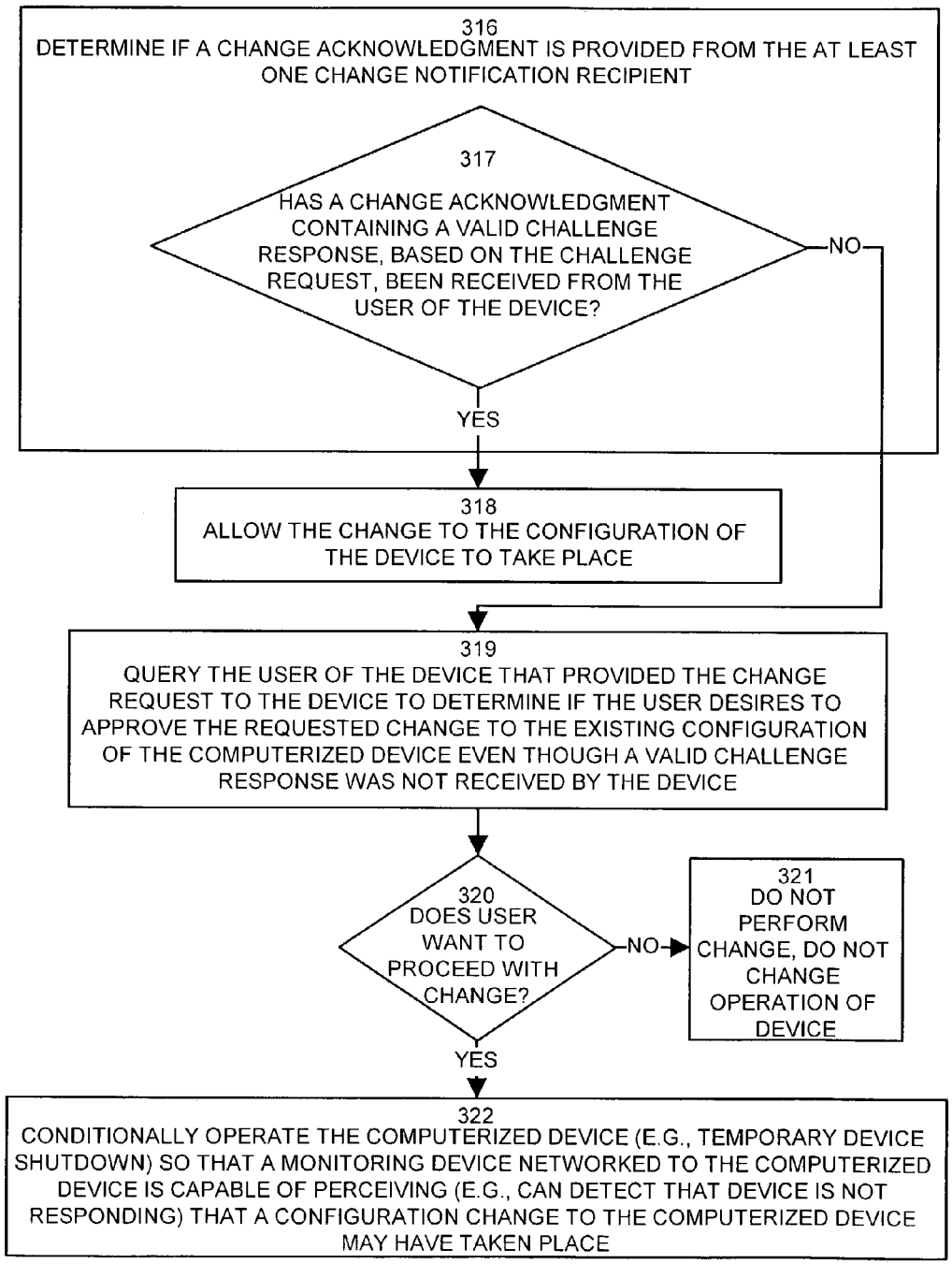

After processing of step 315 is complete, processing proceeds step 316 at the top of a flow chart in FIG. 6.

In step 316 in FIG. 6, the change controller 120 determines if the change acknowledgment 176 is provided (i.e., received) from the most recent change notification recipient 155 to which the most recent change notification message 173 was transmitted (i.e., in step 315 in FIG. 5).

In sub-step 317, the change controller 120 determines if a change acknowledgment 176 containing a valid challenge response 412, based on the challenge request 402, has been received from the user 150 operating the user computer device 155. If the user 150 enters a valid challenge response 412 in the form of the change acknowledgment 176, processing proceeds from step 317 to step 318.

In step 318, since the change controller 120 receives a valid change acknowledgment 176, the change controller 120 allows the requested change specified in the change request 170 to the existing configuration 118 of the computerized device 110 to take place.

Returning attention to sub-step 317, if no change acknowledgment is received from the user 150 operating the user computer device 155, processing proceeds to step 319 in FIG. 6.

In step 319 the change controller 120 queries the user 150 of the user computer device 155 that provided the original change request 170 (to the computerized device 110) to determine if that user 150 desires to approve the requested change to the existing configuration 118 of the computerized device 110, even though a valid challenge response 412 was not received by the change controller 120 operating within the computerized device 110. In other words, at this point in processing, the change controller 120 has not been able to obtain a valid change acknowledgment from any monitoring device 130, nor from a user 150 attempting to make change. Accordingly, at step 319, the change controller 120 indicates this to the user attempting to make change and asks if the user still desires to proceed with a change. It is to be understood that this processing is optional in this embodiment and the change controller 120 could instead refuse to allow the change to take place and could notify the monitoring device 130 of an attempted change that is denied.

In step 320, if the user does not want to proceed with the requested change, change controller processing proceeds to step 321 at which point the change controller 120 does not perform the change and does not change operation of the computerized device 110 in response to receiving the change request 170. Alternatively, in step 320, if the change controller 120 receives an affirmative response to the user 150 indicating that the user 150 still desires to proceed with the change requested in the change request 170, processing proceeds to step 322.

In step 322, the change controller 120 conditionally operates the computerized device 110 such as, for example, by performing a temporary device shutdown, so that a monitoring device 130 networked to the computerized device 110 is capable of perceiving (e.g., can detect that the computerized device 110 is no longer present for a period of time on the network) that a configuration change to the existing configuration 118 of the computerized device 110 may have taken place. In other words, in step 322 the change controller 120 forces, mandates or otherwise requires that, prior to allowing the requested change specified in the change request 170 to be carried out to the existing configuration 118, the computerized device 110 undergoes a conditional operation to ensure that a monitoring device 130 that is performing a periodic polling or other operational check of the computerized device can detect the possibility that the existing configuration 118 of the computerized device 110 may have potentially been modified during the conditional operation.

Examples of conditional operation of the computerized device can include device shutdown for a predetermined period of time that is sufficient for the monitoring device 130 operating the change monitor process 140 to detect the computerized device 110 is not functioning or available within the computer network 105. The shutdown time period may, for example, be set or configured to exceed the time period between which heartbeat signals or other keep alive mechanisms between the computerized device 110 and the monitoring device 130 normally operate thus indicating to the monitoring device 130 to the computerized device has suffered in abnormal or unscheduled shutdown during which the computerized device 110 may have become compromised by a malicious user 150.

Details of processing within step 322 to perform the conditional operation of the computerized device 110 are shown in a flow chart of processing steps illustrated in FIG. 7.

FIG. 7 illustrates details of processing step 322 from FIG. 6 in which the change controller 120 causes the computerized device 110 to perform the conditional operation so that a monitoring device 120 networked to the computerized device 110 is capable of perceiving or detecting that a configuration change to the existing configuration 118 of the computerized device 110 may have taken place during the conditional operation.

Specifically, in step 323, the change controller 120 performs a mandatory and temporary shutdown sequence of the computerized device 110 prior to allowing the requested change in the change request 170 to take place.

As shown in sub-step 324, during the shutdown time period of the conditional operation, the monitoring device 130 attempts to contact the computerized device 110 to verify operation of the computerized device 110 but cannot do so due to the shutdown sequence. Accordingly, the monitoring device 130 is thus capable of detecting the mandatory shutdown sequence of the device 110 and indicates, into the configuration state database 145, that the computerized device 110 were shutdown in an unscheduled manner and does a potential exists for malicious or unauthorized configuration changes that have taken place to the existing configuration 118. Details of the operation of the monitoring device configures according to one embodiment of the invention are shown in FIG. 8.

Figure 8:
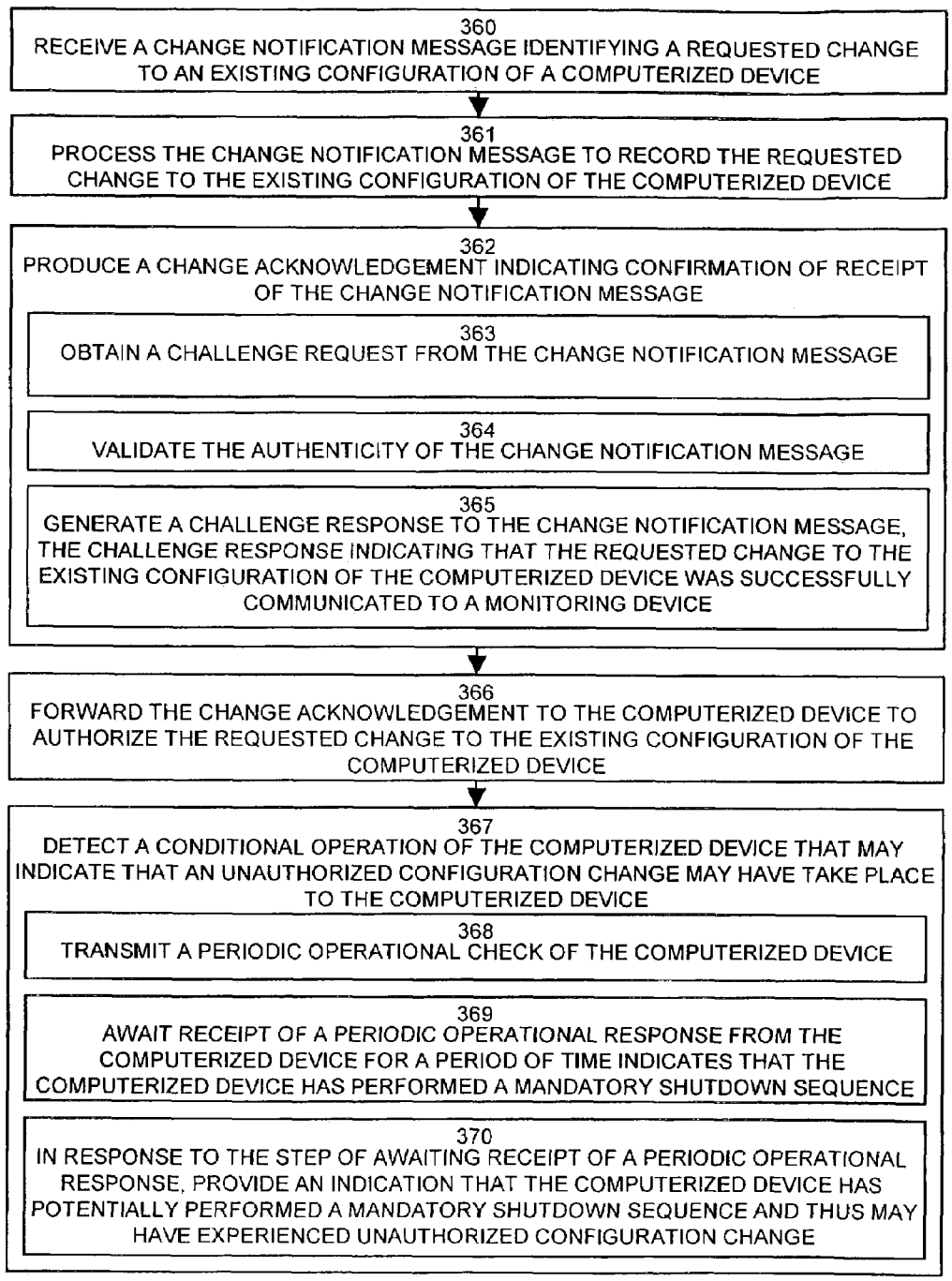
FIG. 8 is a flow chart of processing steps as performed by a change monitor operating in a monitoring device configured in accordance with embodiments of the invention.

FIG. 8 is a flow chart of processing steps that a monitoring device 130 configured with a change monitor 140 performs in accordance with one example embodiment of the invention for detecting modification to a configuration of a computerized device.

In step 360, the change monitor 140 receives a change notification message identifying a requested change to an existing configuration of a computerized device. Examples of the contents of a change notification message 171, 173 and 174 are provided above.

In step 361, the change monitor 140 processes the change notification message to record the requested change to the existing configuration of the computerized device. As an example, the information in fields 400 through 405 can be recorded into the configuration state database after verification of the digital signature 406.

Next, in step 362, the change produces a change acknowledgement indicating confirmation of receipt of the change notification message. Details of processing related to step 362 are shown in sub-steps 363 through 365.

In step 363, the change monitor 140 obtains a challenge request 402 (FIG. 3B) from the change notification message. Recall from the above discussion that the challenge request 402 is a value computed according to a known hashing algorithm.

In step 364, the change monitor 140 in this example embodiment validates the authenticity of the change notification message 171 or 173, 174 by validating the value in the challenge request 402 using the known hashing algorithm.

Next, in step 365 the change monitor 140 generates a challenge response 412 to the change notification message 171 or 173, 174. The challenge response 412 indicates that the requested change to the existing configuration of the computerized device was successfully communicated to a monitoring device. The challenge response may be a hash of the entire contents (or portions thereof) of the change notification message 171 or 173, 174.

After generating the change notification message, in step 366 the change monitor 140 forwards the change acknowledgement message 172 or 175, 176 to the computerized device 110 to authorize the requested change to the existing configuration of the computerized device.

This processing of steps 360 through 366 may be repeated for each change request 170 that the change controller 120 receives. Note that the mechanisms for receiving the change notification information (i.e., messages 171 or 173, 174) can vary. For message 171 in a first sequence, the change monitor 140 can use a network interface of the monitoring device 130 coupled to the Internet, for example, to receive and process the message in a fully automated manner. Alternatively, if a human user 150 is required to dial in to the monitoring device 130 (or through a proxy device acting to receive the information 173) during a second sequence (e.g., if the link 107 in FIG. 1 is severed or not available for some reason), the change notification information 174 can be received, for example, via a telephone call, or another messaging means (e.g., email, instant message, wireless link system or the like) or via a third part device (e.g., telephone 165). This "out-of-band" receipt causes the change monitor 140 to process the information received as explained above (e.g., receive the challenge request and provide a challenge response and return the information over the "out-of-band" response or secondary communications channel back to the provider of the change notification information (e.g., back to the person 150 who dialed in). This can be done, for example, using automated voice and/or touch-tine processing systems.

When the person 150 (or a program) receives back the change acknowledgement information 175, they (or it) can then enter this information into an interface (e.g., a graphical user interface) on their computer display 160 for transmission as a change acknowledgement message 176 back to the change controller 120 for authentication. In this manner, even if the link 107 is severed (in FIG. 1), the system of the invention is able to require receipt of a change acknowledgement 176 (thus guaranteeing that the change monitor 140 is aware of the change being made) or force the conditional operation of the computerized device 110 to allow the change monitor 1140 to detect this conditional operation from which the change monitor 140 can thus deduce or infer that some change may have taken place to the computerized device 110. In highly secure network environments, any tampering with a device 110 will thus cause the system of the invention to either notify the change monitor 140 to have knowledge of the specific of the tampering (i.e., via the change notification and acknowledgement techniques explained herein) or alternatively, will force the device 110 to perform the conditional operation 110 prior to allowing the change which thus causes the change monitor 140 to at least detect or perceive that a change may have taken place to the device 110. This can be indicate to a security monitor program or person who then performs further investigation to determine if a change occurred and if the device 110 has been compromised in any way.

Accordingly, in addition to processing change notification and acknowledgement messages as explained above, in step 367, a monitoring device equipped with a change monitor 140 in accordance with embodiments of the invention includes the ability to detect a conditional operation 177 of the computerized device 110 that may indicate that an unauthorized configuration change may have taken place to the computerized device 110. This can be done, for example, by detecting an unscheduled shutdown of the computerized device 110 using the periodic polling technique 192, 194 (FIG. 1) to ensure the computerized device is operating properly during non-scheduled maintenance times.

In particular, in step 368 the change monitor 140 detects a conditional operation of the device that may indicate that an unauthorized configuration change may have taken place to the computerized device by transmitting a periodic operational check 192 of the computerized device 110 to the computerized device, as shown in FIG. 1. This can be a poll 192 in a polling protocol to ensure that the computerized device 110 is not in a shutdown state. As noted above, in alternative arrangements, the computerized device 110 may be responsible for periodically sending a heartbeat or other "keep alive" signal or message 194 for periodic detecting by the change monitor 140. In this example however, a poll 192 and response 194 technique are described, but it is to be understood that the invention is not limited as such.

In step 369, the change monitor 130 awaits receipt of a periodic operational response 194 from the computerized device 110 for a period of time is sufficient to detect and thus indicate (i.e., infer or deduce) that the computerized device 110 has performed a mandatory shutdown sequence. If the change monitor 140 receives the periodic operational response 194, then it can infer that no conditional operation of the device 110 has occurred (and thus the device 110 is not undergoing an unauthorized change).

In step 370, if no periodic operational response 194 is received after awaiting receipt of a periodic operational response for the predetermined time period (e.g., a time period greater than the amount of time between two of more periodic operational polls, but less than a total conditional operation or shutdown time), the change monitor 140 provides an indication (e.g., into the configuration state database 145, and/or to a network manager or security operator 190) that the computerized device 110 has potentially performed a mandatory shutdown sequence and thus may have experienced an unauthorized configuration change (i.e., may be compromised).

To this end, embodiments of the invention provide a system to perform robust auditing and tracking of configuration changes to existing configurations 118 of the computerized device 110 and make it difficult if not impossible for a user 150 to perform or carry out a change to the existing configuration 118 without causing the system of the invention to provide some notification to a change monitoring device 130 of the possibility that such a malicious change may have taken place. During the processing of step 324, the monitoring device 130 can for example, provide notification such as an e-mail message to the network administrator 190 to indicate that the existing configuration 118 may have experienced change since the computerized device 110 perform the conditional operation 177. The network administrator 190 can then investigate the existing configuration 118 of the computerized device 110 in an attempt to ascertain whether or not this configuration was changed.

It is to be understood that embodiments of the invention can include the change controller 120 as software (e.g., logic instructions, data and code in a computer readable medium), or as an executing or otherwise operating process, or configured within a computerized device 110. Embodiments of the invention also include the change monitor 140 as software, or as a process, or configured within a monitoring device 130. Either one of the change controller 120 and/or the change monitor 140 can be considered separate embodiments of the invention. Embodiments of the invention further include a system that includes a computerized device operating a change controller 120 and a monitoring device 130 operating a change monitor 140 in conjunction with each other, as explained herein.

Those skilled in the art will understand that there can be many variations made to the embodiments explained above while still achieving the same objective of those embodiments and the invention in general. As an example, rearrangement of the processing steps in the flow charts may be performed by those skilled in the art while still achieving the objectives of embodiments of the invention as explained herein.

In addition, it is to be understood that modifications to the content of change notification messages 171 and 173 and change acknowledgment messages 172 and 176 may be made while still being within the scope of embodiments of the invention. Further still, the existing configuration 118 can contain a limited set of configuration parameters, software modules or other settings for which unauthorized change causes the computerized device 110 to become compromised. As an example, embodiments of the invention might be applied, in some circumstances, only to certain configurable aspects of the computerized device 110 such as when a user attempts to while other configuration changes may not be subject to such scrutiny.

Further still, changes to the aforementioned configurations can be made such as alterations to the duration of time of the conditional operation such as during shutdown time periods of the device can be made while still being within the scope of the present invention. It is also to be understood that any type of digital signature and public key encryption techniques can be used to transmit and verify authenticity of the change notification and change announcement messages between the computerized device 110 in the monitoring device 130.

Further still, for installations containing large numbers of computerized devices 110, many monitoring devices 130 can be provided in order to distribute the load and processing burdens presented by transferring and processing change notification and change announcement messages. By forcing a prolonged shutdown or outage of the device prior to allowing unaudited upgrades or other changes allows a monitoring device 130 to detect the lack of device operation. The total time of device shutdown or other conditional operation (e.g., halting of the periodic operational polling or heartbeat protocol 192, 194) can be selected by the network administrator 190 in order to choose a trade-off between how long such an unaudited upgrade may take (i.e., how long it may take to make a compromising change to the device 110) in contrast with how long the computer network 105 can sustain correct operation without utilizing the operation of the computerized device 110. Accordingly, any device outage caused either by operation of embodiments of the invention or by some other act such as an act of nature (e.g., a power failure) can cause the monitoring device 130 to treat the condition as a worst-case scenario and indicate to the network administrator 190 the conditional operation 177 of the device may have occurred.

Such variations and concepts are intended to be covered by the scope of this invention. As such, the foregoing description of embodiments of the invention is not intended to be limiting. Rather, any limitations to the invention are presented in the following claims.

What is claimed is:

1. A method for tracking modification to a configuration of a computerized device, the method comprising the steps of:

receiving a change request indicating a requested change to an existing configuration of the computerized device;

preparing a change notification message identifying the requested change to the existing configuration of the computerized device;

transmitting the change notification message to at least one change notification recipient; and determining if a change acknowledgement is provided from the at least one change notification recipient in response to transmitting the change notification message, the change acknowledgement indicating confirmation of receipt of the change notification message, and if a change acknowledgement is provided from the at least one change notification recipient that indicates confirmation of receipt of the change notification message, allowing the requested change to the configuration of the computerized device to take place; and if the change acknowledgement is not provided from the at least one change notification recipient, operating the computerized device so that a monitoring device networked to the computerized device is capable of detecting that a configuration change to the computerized device may have taken place.

2. The method of claim 1 wherein the step of preparing the change notification message is performed in response to the step of receiving the change request and comprises the steps of:

generating a challenge request for the change notification message, the challenge request corresponding to an associated challenge response that, if received by the computerized device, can confirm receipt of the challenge request;
producing change notification signature information based on new configuration information specified within the change request that is to modify the existing configuration of the computerized device, the change notification signature information including:
  i) a signature of the new configuration information within the change request;
  ii) an identity of a user and user device that provides the change request to the computerized device;
  iii) an identity of the computerized device that received the change request; and
  iii) a timestamp associated with the change request; and
combining the challenge request and the change notification signature information within the change notification message in preparation for transmission to the at least one change notification recipient.

3. The method of claim 2 wherein:
the requested change to the existing configuration of the computerized device indicated within the change request includes at least one of:
  a change to a configuration setting of the computerized device that controls operation of the computerized device;
  a replacement of software code in the computerized device; and
  a change to a hardware component of the computerized device.

4. The method of claim 2 wherein:
the steps of transmitting the change notification message and determining if a change acknowledgement is provided from the at least one change notification recipient are performed in a first sequence for a first change notification recipient, and if the change acknowledgement is not provided from the first change notification recipient, the steps of transmitting the change notification message and determining if a change acknowledgement is provided are performed again in a second sequence for a second change notification recipient; and
wherein the first change notification recipient is the monitoring device networked to the computerized device and the second change notification recipient is a user of a user device that provided the change request to the computerized device.

5. The method of claim 2 wherein:
the steps of transmitting the change notification message and determining if a change acknowledgement is provided from the at least one change notification recipient are performed in a first sequence for a first change notification recipient, wherein the first change notification recipient is the monitoring device networked to the computerized device; and
wherein, in the first sequence:
  the step of transmitting the change notification message transmits the change notification message containing the challenge request to the monitoring device networked to the computerized device; and
  the step of determining if a change acknowledgement is provided from the at least one change notification recipient comprises the steps of:
    determining if a change acknowledgement containing a valid challenge response, based on the challenge request, is received in a predetermined amount of time, the valid challenge response indicating that the monitoring device successfully received the change notification message identifying the requested change to the existing configuration of the computerized device, and if the change acknowledgement containing a valid challenge response is received in a predetermined amount of time, performing the steps of:
      allowing the change to the configuration of the computerized device to take place; and
      acknowledging receipt of the change acknowledgement containing the valid challenge response; and
    if a change acknowledgement containing a valid challenge response is not received in a predetermined amount of time, performing the steps of transmitting the change notification message and determining if a change acknowledgement is provided in a second sequence for a second change notification recipient, wherein the second change notification recipient is a user of the user device that provided the change request to the computerized device.

6. The method of claim 5 wherein in the second sequence:
the step of transmitting the change notification message to the second change notification recipient comprises the steps of:
  transmitting the change notification message for visual display of at least a portion of the change notification message to the user of the user device that provided the change request to the computerized device; and
the step of determining if a change acknowledgement is provided from the at least one change notification recipient comprises the steps of:
  determining if a change acknowledgement containing a valid challenge response, based on the challenge request, is received from the user of the user device, the valid challenge response indicating that user of the user device successfully communicated the requested change to the existing configuration of the computerized device to the monitoring device, and if a change acknowledgement containing a valid challenge response is received from the user of the user device, performing the step of:
    allowing the change to the configuration of the computerized device to take place; and
  if a change acknowledgement containing a valid challenge response is not received from the user of the user device that provided the change request, performing the step of:
    conditionally operating the computerized device so that a monitoring device networked to the computerized device perceives that a configuration change to the computerized device may have taken place.

7. The method of claim 6 wherein the step of conditionally operating the device so that a monitoring device networked to the computerized device perceives that a configuration change to the computerized device may have taken place comprises the step of:
  performing a mandatory shutdown sequence of the computerized device during which the monitoring device attempts to contact the computerized device to verify operation of the computerized device but cannot do so thus allowing the monitoring device to detect the mandatory shutdown sequence of the computerized device.

8. The method of claim 6 wherein the step of conditionally operating the computerized device so that a monitoring device networked to the computerized device perceives that a configuration change to the computerized device may have taken place comprises the steps of:

querying the user of the user device that provided the change request to the computerized device to determine if the user desires to approve the requested change to the existing configuration of the computerized device even though a valid challenge response was not received by the computerized device, and if the user of the user device desires to approve the request change to the existing configuration of the computerized device, performing a mandatory shutdown sequence of the computerized device during which the monitoring device attempts to contact the computerized device to verify operation of the computerized device but cannot do so thus allowing the monitoring device to detect the mandatory shutdown sequence of the computerized device.

9. A computerized device comprising:
a memory;
a processor;
a communications interface;
an interconnection mechanism coupling the memory, the processor and the communications interface;
wherein the memory is encoded with logic instructions that comprise a change controller application that, when performed by the processor, forms a change controller process capable of tracking modification to a configuration of the computerized device, the change controller process, when performed by the processor, performing the steps of:
receiving, via the communications interface, a change request indicating a requested change to an existing configuration of the computerized device;
preparing, in the memory, a change notification message identifying the requested change to the existing configuration of the computerized device;
transmitting, from the communications interface, the change notification message to at least one change notification recipient; and
determining if a change acknowledgement is provided, to the communications interface, from the at least one change notification recipient in response to transmitting the change notification message, the change acknowledgement indicating confirmation of receipt of the change notification message, and if a change acknowledgement is provided from the at least one change notification recipient that indicates confirmation of receipt of the change notification message, allowing the request change to the configuration of the computerized device to take place; and if the change acknowledgement is not provided from the at least one change notification recipient, operating the computerized device so that a monitoring device networked to the computerized device is capable of detecting that a configuration change to the computerized device may have taken place.

10. The computerized device of claim 9:
wherein the change controller process performs the step of preparing the change notification message in response to the step of receiving the change request; and
wherein when the change controller process performs the step of preparing a change notification message, the change controller process performs the steps of:
generating a challenge request for the change notification message, the challenge request corresponding to an associated challenge response that, if received by the computerized device, can confirm receipt of the challenge request; and
producing change notification signature information based on new configuration information specified within the change request that is to modify the existing configuration of the computerized device, the change notification signature information including:
  i) a signature of the new configuration information within the change request;
  ii) an identity of a user and user device that provides the change request to the device;
  iii) an identity of the computerized device that received the change request; and
  iii) a timestamp associated with the change request; and
combining the challenge request and the change notification signature information within the change notification message in the memory in preparation for transmission via the communications interface to the at least one change notification recipient.

11. The computerized device of claim 10 wherein:
the requested change to the existing configuration of the computerized device indicated within the change request received via the communications interface includes at least one of:
a change to a configuration setting of the computerized device that controls operation of the computerized device;
a replacement of software code in the computerized device; and
a change to a hardware component of the computerized device.

12. The computerized device method of claim 10 wherein:
the change controller process performs the steps of transmitting the change notification message and determining if a change acknowledgement is provided from the at least one change notification recipient in a first sequence for a first change notification recipient, and if the change acknowledgement is not provided from the first change notification recipient, the change controller process performs the steps of transmitting the change notification message and determining if a change acknowledgement is provided again in a second sequence for a second change notification recipient; and
wherein the first change notification recipient is the monitoring device networked to the computerized device and the second change notification recipient is a user of a user device that provided the change request to the computerized device.

13. The method of claim 10 wherein:
the change controller process performs the steps of transmitting the change notification message and determining if a change acknowledgement is provided from the at least one change notification recipient in a first sequence for a first change notification recipient, wherein the first change notification recipient is the monitoring device networked to the computerized device; and
wherein, in the first sequence:
the change controller process performs the step of transmitting the change notification message to transmit the change notification message containing the challenge request to the monitoring device networked to the computerized device; and
when the change controller process performs the step of determining if a change acknowledgement is provided from the at least one change notification recipient, the change controller process performs the steps of:
  determining if a change acknowledgement containing a valid challenge response, based on the challenge request, is received in a predetermined amount of time, the valid challenge response indicating that the monitoring device successfully received the change notification message identifying the requested change to the existing configuration of the computerized device, and if the change acknowledgement containing a valid challenge response is received in a predetermined amount of time, the change controller process performs the steps of:
    allowing the change to the configuration of the computerized device to take place; and
    acknowledging receipt of the change acknowledgement containing the valid challenge response; and
  if a change acknowledgement containing a valid challenge response is not received in a predetermined amount of time, the change controller process performs the steps of transmitting the change notification message and determining if a change acknowledgement is provided in a second sequence for a second change notification recipient, wherein the second change notification recipient is a user of the user device that provided the change request to the computerized device.

14. The computerized device of claim 13 wherein in the second sequence:
  wherein when the change controller process performs the step of transmitting the change notification message to the second change notification recipient the change controller process performs the step of:
    transmitting the change notification message for visual display of at least a portion of the change notification message to the user of the user device that provided the change request to the computerized device; and
  wherein when the change controller process performs the step of determining if a change acknowledgement is provided from the at least one change notification recipient the change controller process performs the step of:
    determining if a change acknowledgement containing a valid challenge response, based on the challenge request, is received from the user of the user device, the valid challenge response indicating that the user of the user device successfully communicated the requested change to the existing configuration of the computerized device to the monitoring device, and if a change acknowledgement containing a valid challenge response is received from the user of the user device, the change controller process performs the step of:
      allowing the change to the configuration of the computerized device to take place; and
    if a change acknowledgement containing a valid challenge response is not received from the user of the user device that provided the change request, the change controller performs the step of:
      conditionally operating the computerized device so that a monitoring device networked to the computerized device via the communications interface perceives that a configuration change to the computerized device may have taken place.

15. The computerized device of claim 14 wherein when the change controller process performs the step of conditionally operating the computerized device so that a monitoring device networked to the computerized device perceives that a configuration change to the computerized device may have taken place, the change controller process performs the step of:
  performing a mandatory shutdown sequence of the computerized device during which the monitoring device attempts to contact the computerized device to verify operation of the computerized device but cannot do so thus allowing the monitoring device to detect the mandatory shutdown sequence of the computerized device.

16. The computerized device of claim 14 wherein when the change controller process performs the step of conditionally operating the computerized device so that a monitoring device networked to the computerized device perceives that a configuration change to the computerized device may have taken place, the change controller process performs the step of:
  querying the user of the user device that provided the change request to the computerized device to determine if the user desires to approve the requested change to the existing configuration of the computerized device even though a valid challenge response was not received by the change controller operating within the computerized device, and if the user of the user device desires to approve the request change to the existing configuration of the computerized device, performing a mandatory shutdown sequence of the computerized device during which the monitoring device attempts to contact the computerized device to verify operation of the computerized device but cannot do so thus allowing the monitoring device to detect the mandatory shutdown sequence of the computerized device.

17. A computerized device comprising:
  a memory;
  a processor;
  a communications interface;
  an interconnection mechanism coupling the memory, the processor in the communications interface;
  wherein the memory is encoded with logic instructions that comprise a change controller application that, when performed by the processor, forms a change controller process capable of providing a means for tracking modification to a configuration of the computerized device, such means comprising:
    means for receiving, via the communications interface, a change request indicating a requested change to an existing configuration of the computerized device;
    means for preparing, in the memory, a change notification message identifying the requested change to the existing configuration of the computerized device;
    means for transmitting, from the communications interface, the change notification message to at least one change notification recipient; and
    means for determining if a change acknowledgement is provided, to the communications interface, from the at least one change notification recipient in response to transmitting the change notification message, the change acknowledgement indicating confirmation of receipt of the change notification message, and if a change acknowledgement is provided from the at least one change notification recipient that indicates confirmation of receipt of the change notification message, allowing the request change to the configuration of the computerized device to take place; and if the change acknowledgement is not provided from the at least one change notification recipient, operating the computerized device so that a monitoring device networked to the computerized device is capable of detecting that a configuration change to the computerized device may have taken place.

18. A computer program product having a computer-readable medium including computer program logic encoded thereon that, when performed on a processor of a computerized device, causes the computerized device to tracking modification to a configuration of the computerized device by performing the operations of:
  receiving a change request indicating a requested change to an existing configuration of the computerized device;
  preparing a change notification message identifying the requested change to the existing configuration of the computerized device;
  transmitting the change notification message to at least one change notification recipient; and
  determining if a change acknowledgement is provided from the at least one change notification recipient in response to transmitting the change notification message, the change acknowledgement indicating confirmation of receipt of the change notification message, and if a change acknowledgement is provided from the at least one change notification recipient that indicates confirmation of receipt of the change notification message, allowing the requested change to the configuration of the computerized device to take place; and if the change acknowledgement is not provided from the at least one change notification recipient, operating the computerized device so that a monitoring device networked to the computerized device perceives that a configuration change to the computerized device may have taken place.

19. A method for detecting modification to a configuration of a computerized device, the method comprising the steps of:
  receiving a change notification message identifying a requested change to an existing configuration of a computerized device;
  processing the change notification message to record the requested change to the existing configuration of the computerized device;
  producing a change acknowledgement indicating confirmation of receipt of the change notification message;
  forwarding the change acknowledgement to the computerized device to authorize the requested change to the existing configuration of the computerized device; and
  detecting a conditional operation of the computerized device that may indicate that an unauthorized configuration change may have take place to the computerized device.

20. The method of claim 19 wherein the step of producing a change acknowledgement indicating confirmation of receipt of the change notification message comprises the steps of:
  obtaining a challenge request from the change notification message;
  validating the authenticity of the change notification message; and
  generating a challenge response to the change notification message, the challenge response indicating that the requested change to the existing configuration of the computerized device was successfully communicated to a monitoring device.

21. The method of claim 19 wherein the step of detecting a conditional operation of the device that may indicate that an unauthorized configuration change may have take place to the computerized device comprises the steps of:
  transmitting a periodic operational check of the computerized device;
  awaiting receipt of a periodic operational response from the computerized device for a period of time indicates that the computerized device has performed a mandatory shutdown sequence; and
  in response to the step of awaiting receipt of a periodic operational response, providing an indication that the computerized device has potentially performed a mandatory shutdown sequence and thus may have experienced unauthorized configuration change.

22. A monitoring device comprising:
  a memory;
  a processor;
  at least one communications interface;
  an interconnection mechanism coupling the memory, the processor and the at least one communications interface;
  wherein the memory is encoded with logic instructions that comprise a change monitor application that, when performed by the processor, forms a change monitor process capable of detecting modification to a configuration of a computerized device, the change monitor process, when performed by the processor, performing the steps of:
  receiving a change notification message over the at least one communications interface identifying a requested change to an existing configuration of a computerized device;
  processing the change notification message to record the requested change to the existing configuration of the computerized device;
  producing a change acknowledgement indicating confirmation of receipt of the change notification message;
  forwarding the change acknowledgement to the computerized device to authorize the requested change to the existing configuration of the computerized device; and
  detecting a conditional operation of the device that may indicate that an unauthorized configuration change may have take place to the computerized device.

23. A system for monitoring changes made to an existing configuration of a computerized device, the system comprising: a computerized device operating a change controller, the change controller causing the computerized device to perform the operations of:
  receiving a change request indicating a requested change to an existing configuration of the computerized device;
  preparing a change notification message identifying the requested change to the existing configuration of the computerized device;
  transmitting the change notification message to at least one change notification recipient; and
  determining if a change acknowledgement is provided from the at least one change notification recipient in response to transmitting the change notification message, the change acknowledgement indicating confirmation of receipt of the change notification message, and if a change acknowledgement is provided from the at least one change notification recipient that indicates confirmation of receipt of the change notification message, allowing the requested change to the configura tion of the computerized device to take place; and if the change acknowledgement is not provided from the at least one change notification recipient, operating the computerized device so that a monitoring device networked to the computerized device is capable of detecting that a configuration change to the computerized device may have taken place; and a monitoring device operating a change monitor, the monitoring device operating as one of the at least one change notification recipients, the change monitor causing the monitoring device to perform the operations of:

receiving a change notification message identifying a requested change to an existing configuration of a computerized device;

processing the change notification message to record the requested change to the existing configuration of the computerized device;

producing a change acknowledgement indicating confirmation of receipt of the change notification message;

forwarding the change acknowledgement to the computerized device to authorize the requested change to the existing configuration of the computerized device; and detecting a conditional operation of the computerized device that may indicate that an unauthorized configuration change may have take place to the computerized device.

* * * * *